US012621529B2

(12) United States Patent
Thomas et al.

(10) Patent No.: US 12,621,529 B2
(45) Date of Patent: May 5, 2026

(54) ENHANCED TELEVISION VIEWING EXPERIENCE BASED ON GROUP VIEWING WATCH PATTERNS

(71) Applicant: Google LLC, Mountain View, CA (US)

(72) Inventors: Royce Korah Thomas, Bangalore (IN); Vinit Laxmikant Agrawal, Nagpur (IN)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/894,839

(22) Filed: Sep. 24, 2024

(65) Prior Publication Data

US 2026/0089362 A1      Mar. 26, 2026

(51) Int. Cl.
　　*H04N 21/466* 　　　(2011.01)
　　*H04N 21/4223* 　　(2011.01)
(52) U.S. Cl.
　　CPC ..... *H04N 21/4668* (2013.01); *H04N 21/4223* (2013.01); *H04N 21/4667* (2013.01)
(58) Field of Classification Search
　　CPC ........... H04N 21/4668; H04N 21/4223; H04N 21/4667
　　USPC ........................................................ 725/46
　　See application file for complete search history.

(56) References Cited

U.S. PATENT DOCUMENTS

| | | | |
|---|---|---|---|
| 2002/0174428 A1* | 11/2002 | Agnihotri | ........ H04N 21/44218 |
| | | | 725/9 |
| 2012/0072939 A1* | 3/2012 | Crenshaw | .............. H04H 60/33 |
| | | | 725/12 |

| | | | |
|---|---|---|---|
| 2012/0183270 A1* | 7/2012 | Greenblatt | .............. G06F 21/34 |
| | | | 386/E5.069 |
| 2012/0222058 A1* | 8/2012 | el Kaliouby | ......... H04N 21/251 |
| | | | 725/10 |
| 2012/0278904 A1* | 11/2012 | Perez | ...................... G06F 21/10 |
| | | | 726/31 |
| 2013/0347038 A1* | 12/2013 | Lee | .................... H04N 21/4622 |
| | | | 725/40 |
| 2019/0333100 A1 | 10/2019 | Sohum et al. | |
| 2020/0077130 A1 | 3/2020 | Ricci | |
| 2021/0029391 A1* | 1/2021 | Choudhari | ......... H04N 21/6582 |
| 2023/0336818 A1 | 10/2023 | Shah et al. | |
| 2023/0370692 A1 | 11/2023 | Kalam | |

OTHER PUBLICATIONS

WO2006052780, Jacobs et al., Method, Software and Apparatus for Activating Resident Applications, Nov. 4, 2005, (Year: 2005).*
Alam, et al., "Tailoring Recommendations to Groups of Viewers on Smart TV: A Real-Time Profile Generation Approach", IEEE Access, vol. 8, Mar. 11, 2020, pp. 50814-50827.

* cited by examiner

*Primary Examiner* — Adil Ocak
(74) *Attorney, Agent, or Firm* — Brake Hughes Bellermann LLP

(57) ABSTRACT

According to an aspect, a method includes receiving, by a computing device, an indication to obtain a picture of a viewing audience of the computing device. A method may receive, by the computing device, the picture of the viewing audience that includes individuals. A method may scan the picture to identify attributes of the individuals included in the viewing audience. A method may create a watch clique that includes the individuals. A method may associate the attributes with the watch clique. A method may determine media content recommendations for viewing by the viewing audience based on the attributes of the watch clique.

20 Claims, 15 Drawing Sheets

500

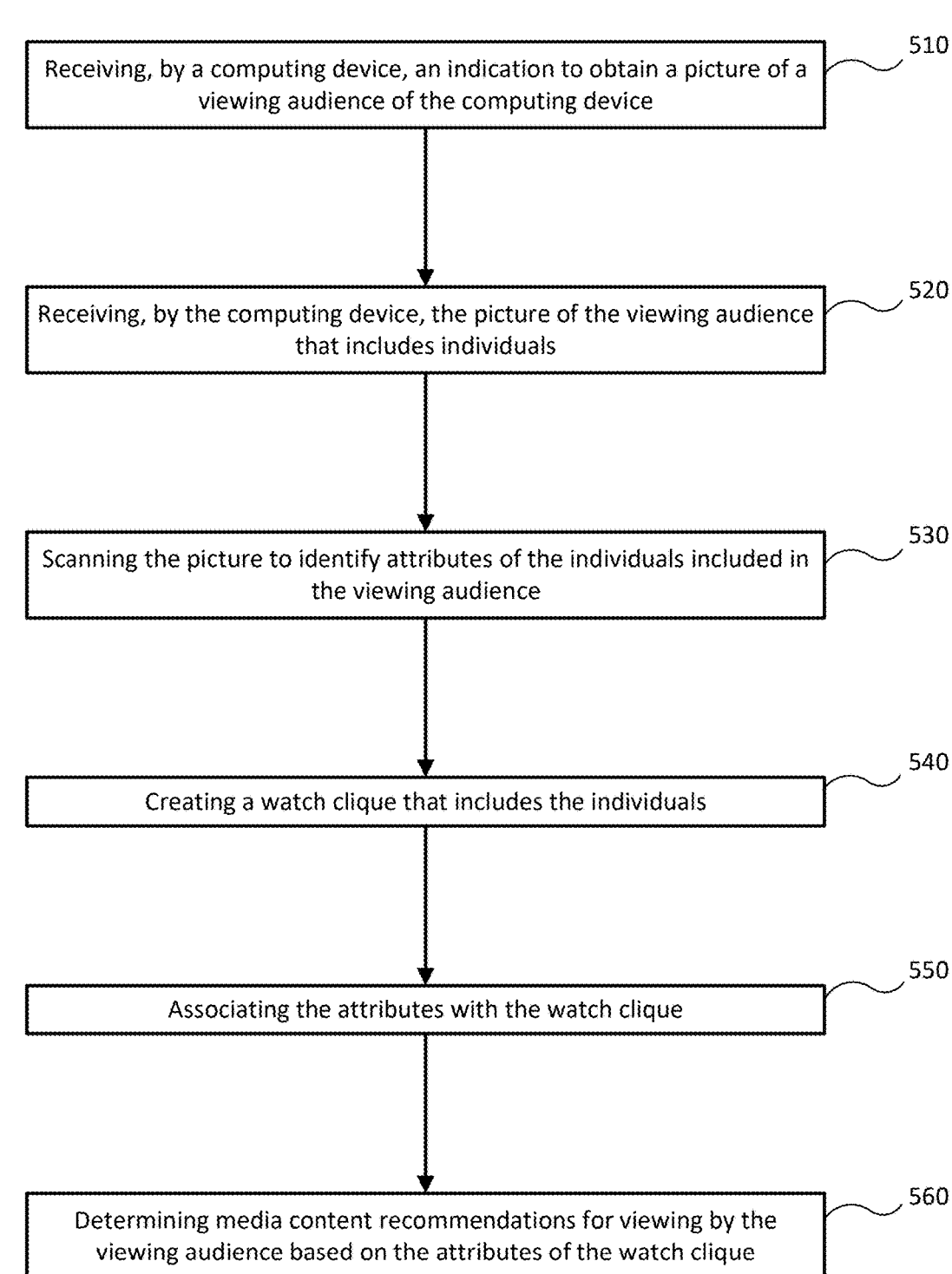

510

Receiving, by a computing device, an indication to obtain a picture of a viewing audience of the computing device

520

Receiving, by the computing device, the picture of the viewing audience that includes individuals

530

Scanning the picture to identify attributes of the individuals included in the viewing audience

540

Creating a watch clique that includes the individuals

550

Associating the attributes with the watch clique

560

Determining media content recommendations for viewing by the viewing audience based on the attributes of the watch clique

ENHANCED TELEVISION VIEWING EXPERIENCE BASED ON GROUP VIEWING WATCH PATTERNS

BACKGROUND

A television (TV) application may present various types of media content of interest to a user. The media content may have different formats such as streaming video and audio. The types of media content may include, but are not limited to, movies, television shows, sporting events, news items, short form videos, and music. In addition, or in the alternative, a variety of media content providers may deliver various types of media content for viewing by the user. The TV application may deliver a customized viewing experience to a user that spans the diverse types of media content provided by the variety of media content providers.

SUMMARY

In a non-limiting example, methods and systems of enhancing a television (TV) viewing experience for a user and/or a group of individuals may be based on viewing watch patterns for the group. The enhanced experience may result in providing the user and/or group with more relevant media content recommendations and advertisements which can result in increased and improved monetization.

In some aspects, the techniques described herein relate to a method including: receiving, by a computing device, an indication to obtain a picture of a viewing audience of the computing device; receiving, by the computing device, the picture of the viewing audience that includes individuals; scanning the picture to identify attributes of the individuals included in the viewing audience; creating a watch clique that includes the individuals; associating the attributes with the watch clique; and determining media content recommendations for viewing by the viewing audience based on the attributes of the watch clique.

In some aspects, the techniques described herein relate to a method, further including: determining that the computing device is communicatively coupled to a camera; and triggering a taking of the picture of the viewing audience by the camera.

In some aspects, the techniques described herein relate to a method, further including: determining that the computing device is not communicatively coupled to a camera; and facilitating the receiving of the picture of the viewing audience from a mobile computing device.

In some aspects, the techniques described herein relate to a method, wherein powering the computing device on provides the indication to obtain the picture of the viewing audience of the computing device.

In some aspects, the techniques described herein relate to a method, wherein creating the watch clique includes naming the watch clique.

In some aspects, the techniques described herein relate to a method, wherein creating the watch clique includes initiating a retaking of the picture of the viewing audience.

In some aspects, the techniques described herein relate to a method, wherein the indication to obtain the picture of the viewing audience of the computing device is received in a first user interface of a television application executing on the computing device; and wherein the method further includes presenting the media content recommendations in a second user interface of the television application.

In some aspects, the techniques described herein relate to a method, wherein the computing device is a smart television.

In some aspects, the techniques described herein relate to a non-transitory computer-readable medium storing executable instructions that when executed by at least one processor of a server computer cause the at least one processor to execute operations, the operations including: receiving an indication to obtain a picture of a viewing audience of a computing device; receiving the picture of the viewing audience that includes individuals; scanning the picture to identify attributes for the individuals included in the viewing audience; creating a watch clique that includes the individuals; associating the attributes with the watch clique; and determining media content recommendations for viewing by the viewing audience based on the attributes of the watch clique.

In some aspects, the techniques described herein relate to a non-transitory computer-readable medium, wherein the operations further include: determining that the computing device is communicatively coupled to a camera; and triggering a taking of the picture of the viewing audience by the camera.

In some aspects, the techniques described herein relate to a non-transitory computer-readable medium, wherein the operations further include: determining that the computing device is not communicatively coupled to a camera; and facilitating the receiving of the picture of the viewing audience from a mobile computing device.

In some aspects, the techniques described herein relate to a non-transitory computer-readable medium, wherein powering the computing device on provides the indication to obtain the picture of the viewing audience of the computing device.

In some aspects, the techniques described herein relate to a non-transitory computer-readable medium, wherein creating the watch clique includes naming the watch clique.

In some aspects, the techniques described herein relate to a non-transitory computer-readable medium, wherein creating the watch clique includes initiating a retaking of the picture of the viewing audience.

In some aspects, the techniques described herein relate to a non-transitory computer-readable medium, wherein the indication to obtain the picture of the viewing audience of the computing device is received in a first user interface of a television application executing on the computing device; and wherein the operations further include presenting the media content recommendations in a second user interface of the television application.

In some aspects, the techniques described herein relate to a non-transitory computer-readable medium, wherein the computing device is a smart television.

In some aspects, the techniques described herein relate to a system including: at least one processor; and a non-transitory computer-readable medium storing instructions that when executed by the at least one processor cause the system to: receive an indication to obtain a picture of a viewing audience of a computing device; receive the picture of the viewing audience that includes individuals; scan the picture to identify attributes for the individuals included in the viewing audience; create a watch clique that includes the individuals; associate the attributes with the watch clique; and determine media content recommendations for viewing by the viewing audience based on the attributes of the watch clique.

In some aspects, the techniques described herein relate to a system, wherein the instructions that when executed by the at least one processor further cause the system to: determine that the computing device is communicatively coupled to a camera; and trigger a taking of the picture of the viewing audience by the camera.

In some aspects, the techniques described herein relate to a system, wherein the instructions that when executed by the at least one processor further cause the system to: determine that the computing device is not communicatively coupled to a camera; and facilitate the receiving of the picture of the viewing audience from a mobile computing device.

In some aspects, the techniques described herein relate to a system, wherein powering the computing device on provides the indication to obtain the picture of the viewing audience of the computing device.

The details of one or more implementations are set forth in the accompanying drawings and the description below. Other features will be apparent from the description and drawings, and from the claims.

BRIEF DESCRIPTION OF THE DRAWINGS

FIG. 5 illustrates a flowchart depicting example operations of creating a watch clique according to implementations described throughout this disclosure.

DETAILED DESCRIPTION

Figure 1A:
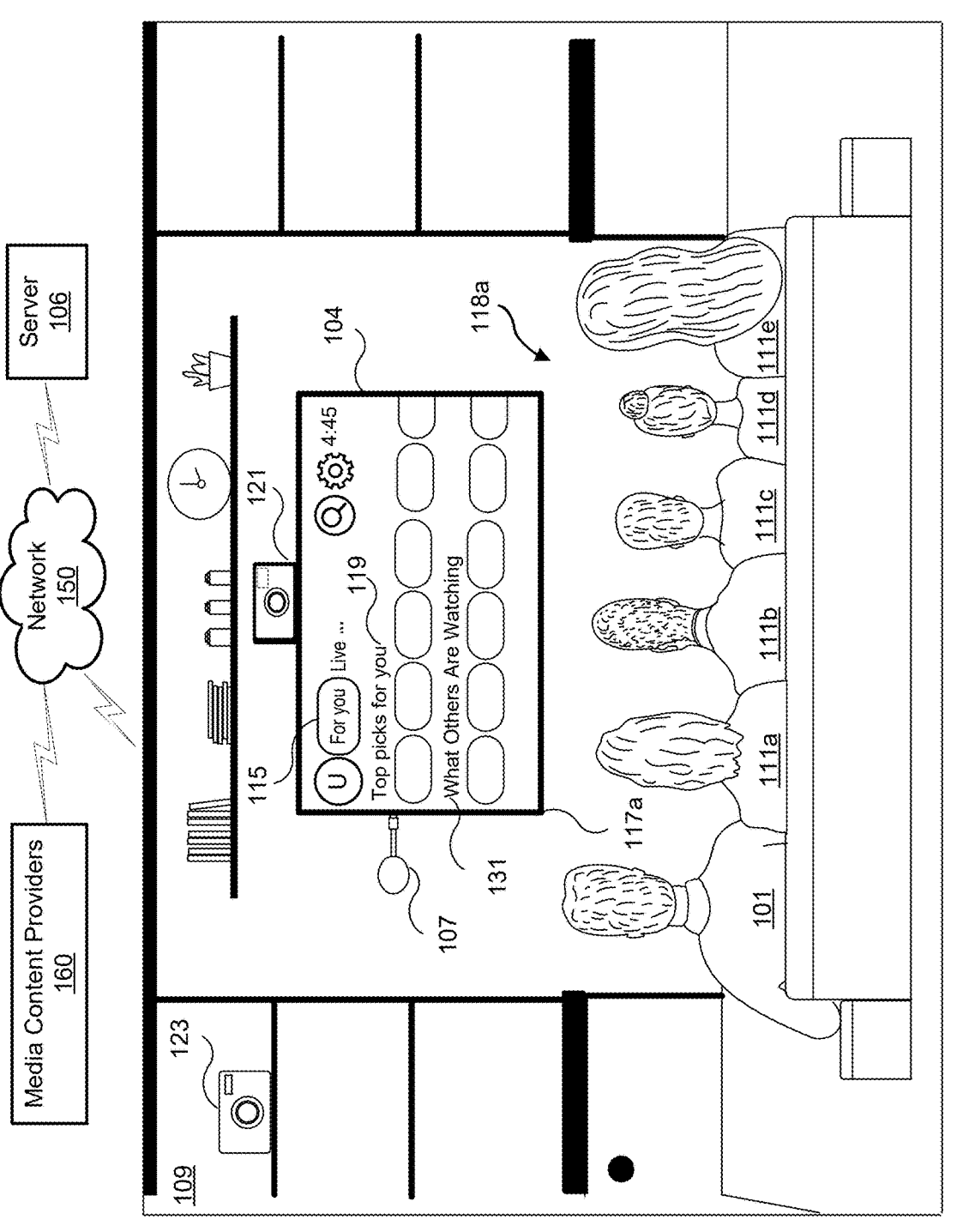
FIGS. 1A-E are illustrations of an example of a user interacting with a network-connected display device and a media adapter in an environment of the user according to implementations described throughout this disclosure.

In general, a user may interface with a television (TV) application running on a network-connected display device (e.g., a television, a smart TV). The TV application may interface with a server-side TV application (e.g., a TV application running on a server that is communicatively connected to the network-connected display device). A user may have a TV account associated with the user. The TV application and/or the server-side TV application may determine user (e.g., viewer) metrics for the TV account for the user assuming that the network-connected display device (e.g., a television, a smart TV) when in use is being watched by a single user (e.g., the user associated with the TV account).

In some implementations, a user may watch media content on a network-connected display device (e.g., a television, a smart TV) with other people (e.g., not alone). For example, a user may watch media content with friends, family members, etc. in the comfort of the home of the user. In some examples, the user may have a large room (e.g., a home theater, a family room) devoted to watching the network-connected display device (e.g., a television, a smart TV). As more users obtain large screen network-connected display devices (e.g., televisions, smart TVs) in their homes along with the growing availability of over-the-top (OTT) first releases of movies and other media content, users now have a new way of watching media content (e.g., first run movies) as opposed to the traditional way of having to go to a movie theater.

In general, a TV application running on a network-connected display device (e.g., a television, a smart TV) may provide media content recommendations for the user of the TV application. In some cases, however, the user may be watching the TV with other people and may want media content recommendations reflective of the viewing audience. In some implementations, a network-connected display device (e.g., a television, a smart TV) may obtain information and data representative of the people viewing the network-connected display device. A TV application running on the network-connected display device may use the information and data representative of the people viewing the network-connected display device (e.g., a viewing audience) to identify a group demographic for the audience. As some examples, the user may want to watch media content items on the network-connected display device along with others located in the room with the user such as friends, family members, children, adults, adults and children, etc. In addition, or in the alternative, the user may want to watch the media content items on certain days and at particular times of the day which could influence who may be in the audience and what content they want to watch.

Each viewing group or audience may be referred to as a watch clique. A user may be associated with one or more watch cliques. A watch clique may also be associated with various other criteria such as the year, day, and/or time of day. Based on the watch clique and other criteria such as, for example, the day and/or the time of day, the weather, and/or the season, a recommendation module may provide the TV application with media content recommendations catered to the watch clique. In addition, or in the alternative, an advertisement module may provide the TV application with recommended advertising content for providing to the user that is directed towards the demographics of the identified watch clique. The more directed advertisements may result in an increased click through rate (CTR). The TV application may beneficially provide more targeted media content recommendations and advertisements resulting in an improved user experience and higher advertisement monetization.

In some implementations, a TV application may identify one or more individuals or people for inclusion in a group of viewers (e.g., a watch clique). The TV application may receive image information about the individuals watching or viewing the network-connected display device (e.g., the viewing audience). An image identification application may interface with the TV application to provide the image information about the viewing audience to the TV application. The image information may include viewer attributes that may include, but are not limited to, an age category or group for each viewer (e.g., adult, teenager, child, etc.), a gender for each viewer (e.g., male, female), and a state or mood of the viewer (e.g., the eyes of the viewer are closed, the viewer is laughing, the viewer is smiling). The TV application may create a watch clique and associate the watch clique with the viewer attributes. In some implementations, the TV application may provide a name for the watch clique. In some implementations, the user of the TV application may provide a name for each identified watch clique (e.g., my family, children, adult male friends, adult couples, adult female friends, neighborhood families, etc.). The TV application may associate regular viewing frequencies with a watch clique. For example, the children watch clique watches child appropriate media content (e.g., cartoons) on Saturday mornings. The adult couples watch clique watches adult media content on Saturday nights.

The disclosure generally relates to systems and methods for identifying, creating, and managing watch cliques of viewers of a network-connected display device (e.g., a television, a smart TV). A TV application can use the information and data gathered about the watch clique to provide improved media content recommendations that are tailored to the viewer audience of the watch clique. In addition, or in the alternative, TV application can use the information and data gathered about the watch clique to provide more relevant advertisements resulting in increased monetization.

For example, at least one technical problem is determining attributes of individuals in a viewing audience of a television. At least one technical solution is to scan a photograph of the viewing audience to determine attributes of the individuals in the viewing audience and to create a watch clique that includes the individuals in the viewing audience. At least one technical effect is the use of determined attributes for a watch clique as criteria for determining and providing media content recommendations directed towards the viewing audience as a watch clique.

Figure 1B:
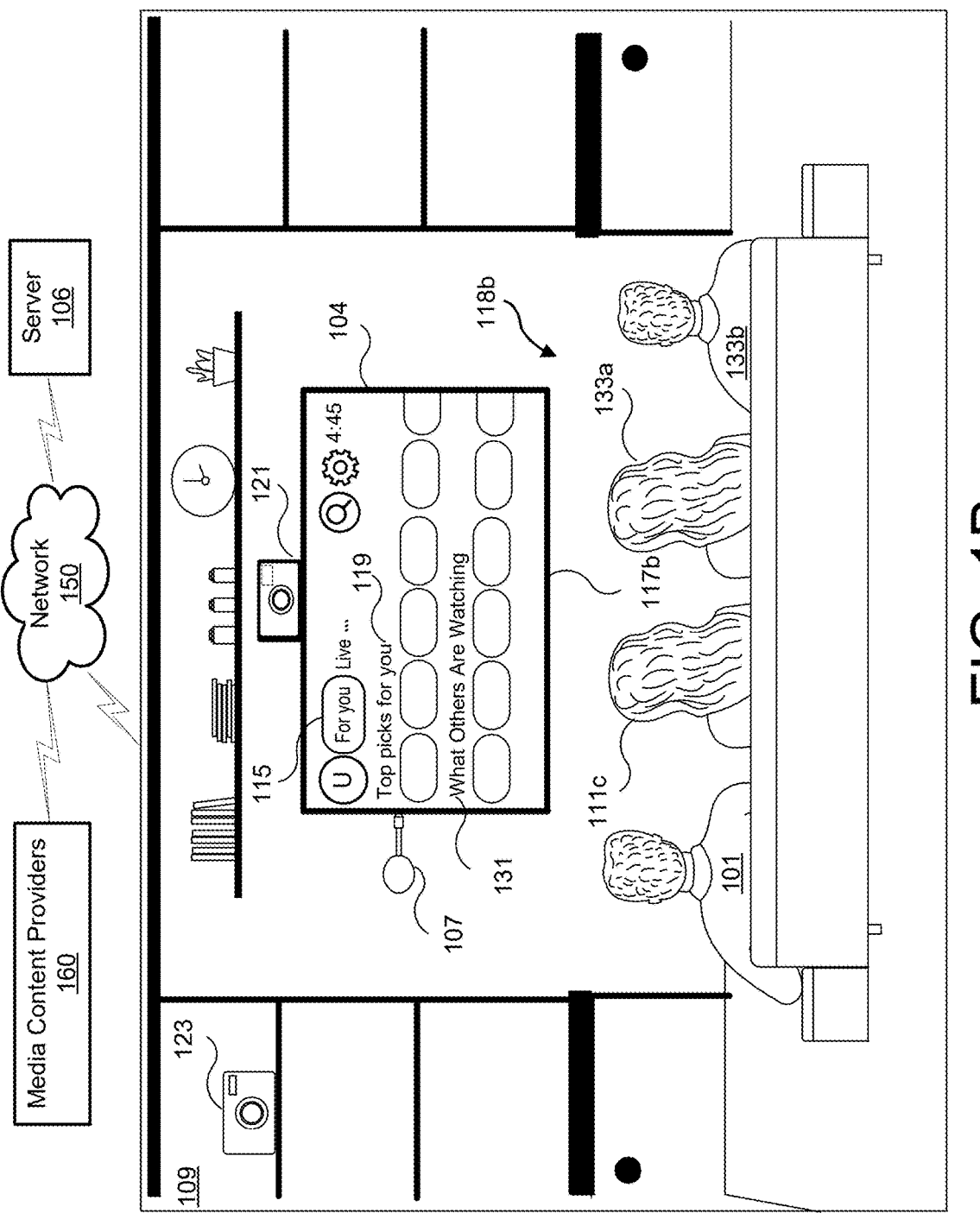
Figure 1C:
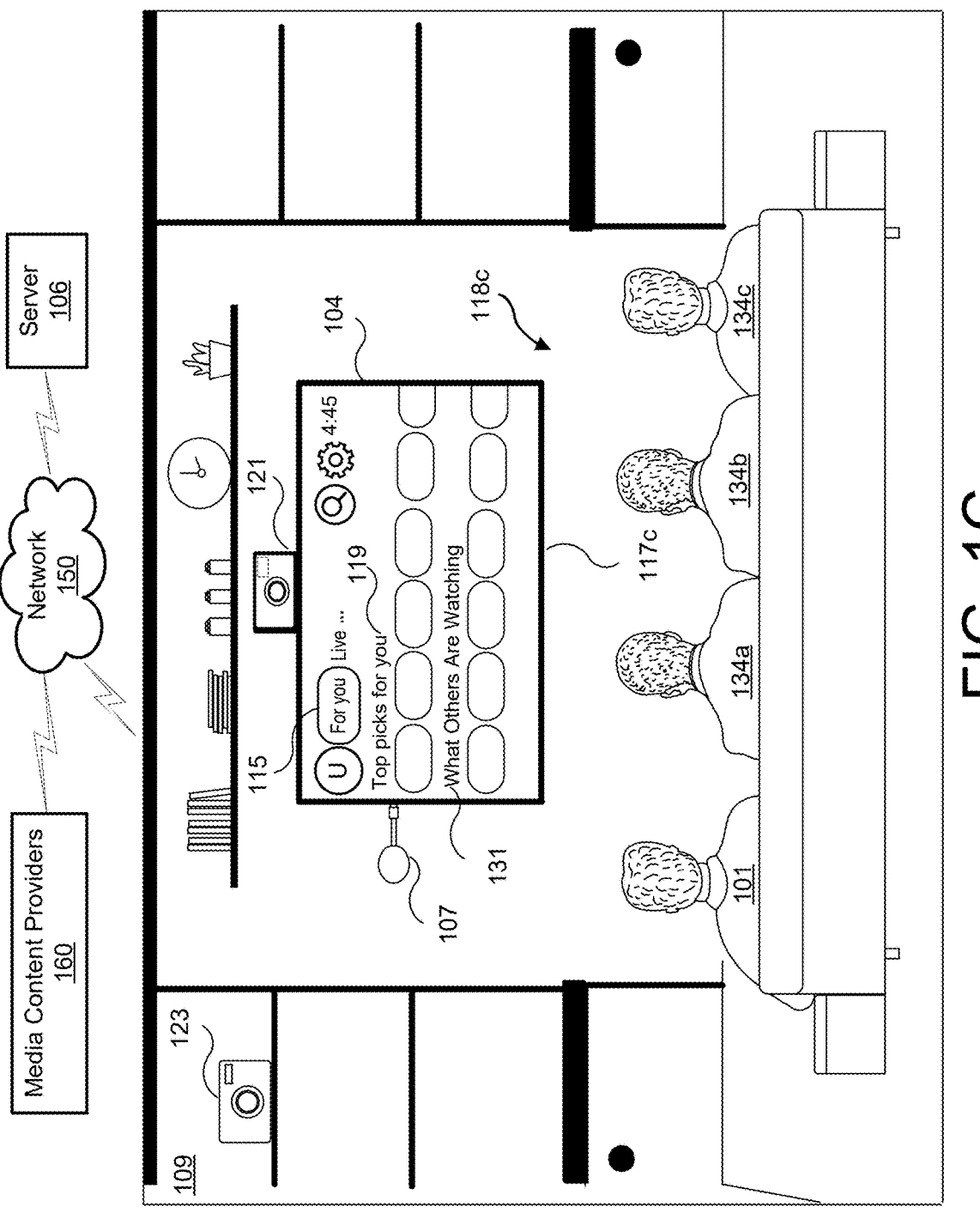

FIGS. 1A-C are illustrations of an example of a user 101 interacting with a network-connected display device 104 and a media adapter 107 in an environment 109 of the user 101 (e.g., a room in the home of the user 101). The user 101 may be watching media content on the network-connected display device 104 along with other people. The user 101 may have an account associated with a TV application running on the network-connected display device 104. Referring to FIG. 1A, the user 101 may be watching media content on the network-connected display device 104 along with individuals 111a-e. For example, the user 101 may be a father, individual 111b may be a grandmother, individual 111c may be a grandfather, individuals 111c-d may be children, and individual 111e may be a mother. For example, the viewing audience 118a may be a family.

Referring to FIG. 1B, the user 101 may be watching media content on the network-connected display device 104 along with individual 111e and individuals 133a-b. For example, the individual 111e may be an adult (e.g., a spouse or significant other of the user 101, a mother) and individuals 133a-b may also be adults. The user 101, the individual 111e, and the individuals 133a-b may be adult viewers in a viewing audience 118b of the network-connected display device 104. For example, the viewing audience 118b may be adult friends or family (e.g., two couples) forming an adult viewing audience.

Referring to FIG. 1C, the user 101 may be watching media content on the network-connected display device 104 along with individuals 134a-c. For example, the individuals 134a-c may be adult males. The user 101 may also be an adult male. The user 101 and the individuals 134a-c may be adult male viewers in a viewing audience 118c of the network-connected display device 104. For example, the viewing audience 118c may be adult male friends and/or family (e.g., four men) forming an adult male viewing audience.

Figure 1D:
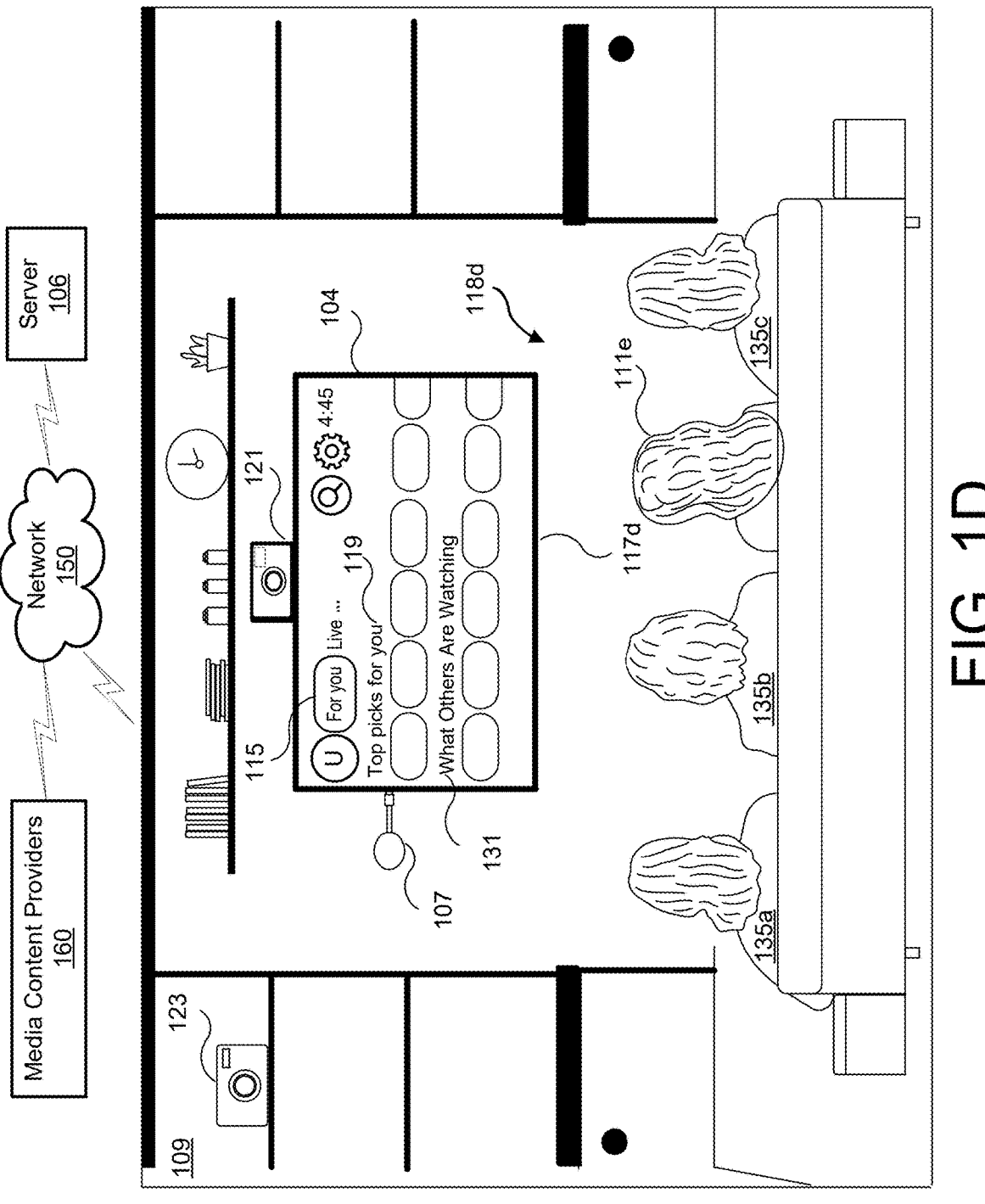

FIG. 1D is an illustration of an example of a user (e.g., individual 111e) interacting with a network-connected display device 104 and a media adapter 107 in an environment 109 of the individual 111e (e.g., a room in the home of the individual 111e). Referring to FIGS. 1A-D, the user 101 may not be watching media content on the network-connected display device 104. For example, individual 111e may be watching media content on the network-connected display device 104 along with individuals 135a-c. For example, the individuals 135a-c may be adult females. The individual 111e may be an adult female that is the spouse or significant other of the user 101. The individual 111e may also have an account associated with the TV application running on the network-connected display device 104. The individual 111e and the individuals 135a-c may be adult female viewers in a viewing audience 118d of the network-connected display device 104. For example, the viewing audience 118d may be adult female friends and/or family (e.g., four women) forming an adult female viewing audience.

Figure 1E:
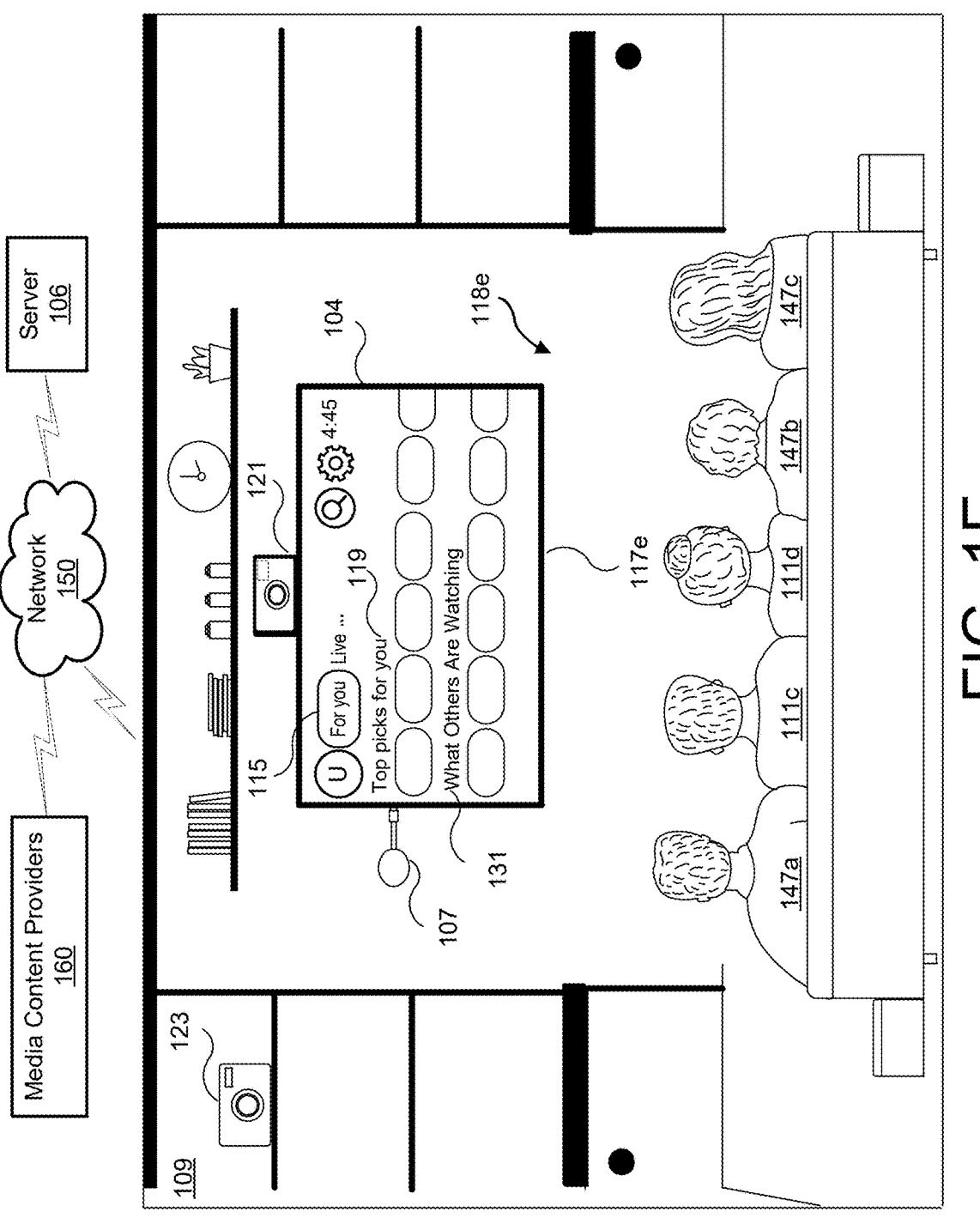

FIG. 1E is an illustration of example users (e.g., individuals 111c-d) interacting with a network-connected display device 104 and a media adapter 107 in an environment 109 of the individuals 111c-d (e.g., a room in the home of the individuals 111c-d). Referring to FIGS. 1A-E, the user 101 and/or the individual 111e may not be watching media content on the network-connected display device 104. For example, individuals 111c-d may be watching media content on the network-connected display device 104 along with individuals 148a-c. For example, the individuals 148a-c may be children (e.g., individuals under the age of sixteen years old, individuals under the age of thirteen years old, individuals under the age of ten years old, etc.). The individuals 111c-d may be the children of the user 101 and the individuals 148a-c may be other children that are friends or family members of the individuals 111c-d. The individuals 111c-d and the individuals 148a-c may be children in a viewing audience 118e of the network-connected display device 104. For example, the viewing audience 118*e* may be children within an age group watching Saturday morning cartoons together.

Referring to FIGS. 1A-E, the network-connected display device 104 may be a television set, a television (TV) dongle, or a smart TV. A TV application running on the network-connected display device 104 may interface with and/or be communicatively coupled to a camera. The camera may capture one or more images of a viewing audience (e.g., viewing audiences 118*a-e*). For example, the network-connected display device 104 may include a camera (e.g., integrated camera 121). In another example, the network-connected display device 104 may interface with a camera (e.g., room camera 123) in the environment 109.

In another example, the network-connected display device 104 may include one or more presence sensors (e.g., presence sensor(s) 149). The presence sensor(s) 149 may detect the presence of a viewing audience (e.g., viewing audiences 118*a-e*) by sensing the presence of one or more individuals located in proximity to the network-connected display device 104 (e.g., seated in a room that includes the network-connected display device 104). In some implementations, the presence sensor(s) 149 may detect a difference between an individual being seated or standing. For example, based on detecting that an individual is seated, the sensor(s) 149 may determine that the individual is part of a viewing audience. The presence sensor(s) 149 may interface with the unified television application 130. The presence sensor(s) 149 may detect multiple individuals being seated. The sensor(s) 149 may then notify the unified television application 130 about detecting multiple individuals seated within a viewing distance to the network-connected display device 104. The unified television application 130 may provide a user interface with a prompt that indicates the detection of the presence of multiple individuals (e.g., "Multiple viewers detected—would you like to create/select a Watch Clique?"). A user of the TV application (e.g., user 101) may elect to create a watch clique. The unified television application 130 may proceed to guide the user through the creation of a watch clique as disclosed in more detail referring to FIGS. 3 and 4A-F. A user of the TV application (e.g., user 101) may elect to select an existing watch clique. The unified television application 130 may proceed to guide the user through the selection of a watch clique as disclosed in more detail referring to FIGS. 3 and 4A-F.

Figure 1F:
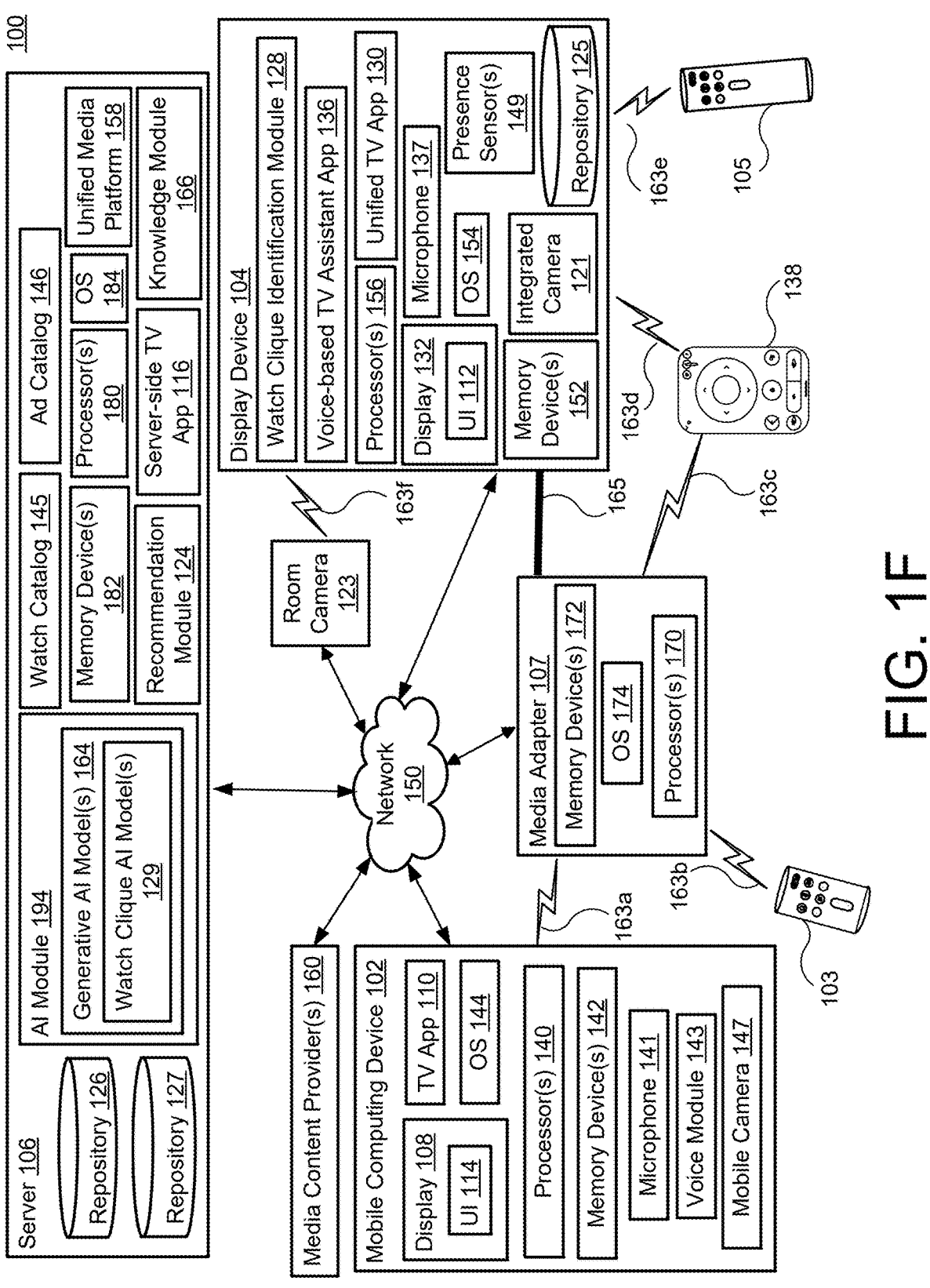
FIG. 1F is an illustration of an example system for identifying, creating, and managing watch cliques of viewers of a network-connected display device according to implementations described throughout this disclosure.

FIG. 1F is an illustration of an example system 100 for identifying, creating, and managing watch cliques of viewers of a network-connected display device (e.g., network-connected display device 104), according to implementations described throughout this disclosure. A TV application (e.g., a unified television application 130) can use the information and data gathered about the watch clique to provide improved media content recommendations that are tailored to the viewer audience of the watch clique. In addition, or in the alternative, the TV application (e.g., the unified television application 130) can use the information and data gathered about the watch clique to provide more relevant advertisements resulting in increased monetization.

Referring to FIGS. 1A-E, the network-connected display device 104 may communicate with a server computer 106 and media content providers 160 by way of a network 150. The media content providers 160, the network-connected display device 104, the server computer 106, and a mobile computing device 102 may interact with and communicate with one other by way of the network 150. In some implementations, the mobile computing device 102 may interface or connect to a media adapter 107 and/or the network-connected display device 104 by way of a wireless communication link that may be a short-range wireless connection such as, for example a Bluetooth connection or a Wi-Fi (e.g., direct Wi-Fi) connection.

In some implementations, a user (e.g., the user 101, the individual 111*e*) may use and/or otherwise interact with a network-connected display device (e.g., network-connected display device 104). For example, a user may log into or otherwise access the account of the user by way of the network-connected display device allowing the user to experience a customized user experience when interacting with a television (TV) application (e.g., unified television (TV) application 130) on the network-connected display device (e.g., the network-connected display device 104). Though the interactions of the user 101 and the individual 111*e* are described herein with reference to the system 100, in some implementations a user may use and/or otherwise interact with different network-connected display devices, mobile computing devices, media adapters, networks, and servers that perform like the system 100. In these implementations, the user may experience a customized user experience when interacting with a television (TV) application on the network-connected display device.

In some implementations, a user (e.g., the user 101, the individual 111*e*) may interact with a network-connected display device (e.g., the network-connected display device 104) using a remote control device (e.g., a remote control device 105). In some implementations, a television (TV) application 110 may render a virtual remote control 138 in a user interface (e.g., UI 114) on a display (e.g., a mobile computing device display 108) on the mobile computing device 102. The virtual remote control 138 may allow the mobile computing device 102 to act as a remote control for the network-connected display device 104. The TV application 110 may render the virtual remote control 138 for use with the network-connected display device 104. The user may interact with the remote control device 105 and/or the virtual remote control 138 when selecting media content for viewing on the network-connected display device 104.

In some implementations, a user (e.g., the user 101, the individual 111*e*) may connect to and interact with a television dongle or a media adapter (e.g., the media adapter 107) using a TV application (e.g., the television (TV) application 110) installed on a mobile computing device (e.g., the mobile computing device 102). In some implementations, the user may connect to and interact with a media adapter (e.g., the media adapter 107) using a media adapter remote control device (e.g., media adapter remote control device 103). In some implementations, the TV application 110 may render the virtual remote control 138 for use with the media adapter 107. The virtual remote control 138 may allow the mobile computing device 102 to act as a remote control for the media adapter 107. The user may interact with the virtual remote control 138 and/or the media adapter remote control device 103 when interacting with the media adapter 107.

The network-connected display device 104 may execute the unified television application 130. The unified television application 130 may interface with a server-side television (TV) application 116. The unified TV application 130 may interface with the server-side TV application 116 to obtain media content recommendations for displaying in a user interface (e.g., user interface (UI) 112) on a display 132 of the network-connected display device 104. For example, referring to FIGS. 1A-D, the unified television application 130 may display the media content recommendations in a top picks for you row 119 in a user interface (e.g., user interfaces 117*a-e*). The media content recommendations in the top picks for you row 119 in the user interfaces 117*a-e* may include media content recommendations based on the information and data related to a watch clique as defined by the respective viewing audiences 118*a-e.*

In addition, or in the alternative, referring to FIGS. 1A-D, the unified television application 130 may display additional and/or alternative media content recommendations in a what others are watching row 131 in a user interface (e.g., user interfaces 117*a-e*). The media content recommendations in the what others are watching row 131 in the user interfaces 117*a-e* may include additional and/or alternative media content recommendations based on the information and data related to what other watch cliques with similar types of viewers and/or similar watch preferences are watching.

In some implementations, referring to FIGS. 1A-D, a user (e.g., the user 101, the individual 111*e*) may connect to and interact with a media adapter (e.g., the media adapter 107) by way of a network-connected display device (e.g., the network-connected display device 104) using a server-side television (TV) application (e.g., server-side TV application 116) installed on a server computer (e.g., the server computer 106). The media adapter 107 may be connected or interfaced to the network-connected display device 104. The network-connected display device 104 may be communicatively coupled or connected to the server computer 106 by way of the network 150. In these implementations, a unified media platform (UMP) 158 may provide or serve media content items from the media content providers 160 to the network-connected display device 104 by way of the media adapter 107.

The server computer 106 may include a knowledge module 166. The knowledge module 166 may include information associated with media content items provided by the media content providers 160. In some implementations, the knowledge module 166 may generate media content recommendations for associating with an account of a user based, in part, on a multi-dimensional user activity characteristic associated with the account of the user and the information associated with media content items provided by the media content providers 160. The user activity characteristic associated with the account of the user may be obtained from a plurality of information sources that may include, but are not limited to, a search engine, a mapping application, and an online retailer. The information sources may provide activity data related to activities of the account of the user by way of a respective software program or application. For example, the activity data related to activities of the account of the user may be associated with watch clique(s) that are associated with the user.

In some implementations, the knowledge module 166 may interface with a recommendation module 124. The recommendation module 124 may generate media content recommendations for associating with a watch clique based on the characteristics of the viewers in the viewing audience for the watch clique. In some implementations, the unified television application 130 may interface with the knowledge module 166 to provide information and data related to the watch behavior of a watch clique when interacting with the unified television application 130. The watch behavior may include, but is not limited to, the viewing history of the watch clique, and/or the popularity of media content items of a type, classification, category, group or genre. The knowledge module 166 may interact with the recommendation module 124 and generative artificial intelligence (AI) model(s) 164 included in an AI module 194 to generate media content recommendations for including in the top picks for you row 119 of the user interfaces 117*a-e* that are dependent on the respective viewing audiences 118*a-e* that define each watch clique. For example, the generative AI model(s) 164 may include watch clique AI model(s) 129.

In some implementations, the recommendation module 124 may generate recommendations for a watch clique based on past user behaviors and/or past watch clique behaviors gathered by the knowledge module 166. The past behaviors may include, but are not limited to, millions of clicks (e.g., movies and/or TV shows selected or clicked on by a user) and impressions (e.g., movies and/or TV shows presented in a user interface but not selected or clicked on) across a large user base. This information and data may be stored on the server computer 106 by the recommendation module 124 and used to train a model (e.g., the generative AI model(s) 164, the watch clique AI model(s) 129).

For example, the model once trained may be used to determine how relevant certain features are in determining media content items (e.g., movies and/or TV show) recommendations for a watch clique. The features may include but are not limited to story, plot, feel, and genre. The recommendation module 124 may weigh each feature based on the determined importance, weighing more relevant features more than less relevant features. The recommendation module 124 may implement a recommendation process using the weighted list of recommended media content items (e.g., movies and/or TV shows) to generate a list of recommended media content items for viewing by a watch clique. For example, referring to FIGS. 1A-D, the unified television application 130 may present the recommended media content items to the viewing audience (e.g., viewing audiences 118*a-e*) in the top picks for you row 119. In addition, or in the alternative, the recommendation module 124 may implement a recommendation process based on media content watched by similar viewing audiences (e.g., similar watch cliques) across a large user base. For example, the unified television application 130 may present the additional or alternative recommended media content items to the viewing audience (e.g., viewing audiences 118*a-e*) in the what others are watching row 131.

In some implementations, the user may interact with a voice-based television (TV) assistant application 136 included on the network-connected display device 104. For example, the voice-based TV assistant application 136 may receive voice data or commands from voice input devices that include a microphone such as the remote control device 105. In some implementations, the network-connected display device 104 may include a voice input device such as a microphone 137. In some implementations, the mobile computing device 102 may provide the virtual remote control 138 in the UI 114 on the mobile computing device display 108 that allows the mobile computing device 102 to act as a remote control for the network-connected display device 104. In some implementations, the voice-based TV assistant application 136 may receive voice data or commands from the mobile computing device 102 when acting as a remote control for the network-connected display device 104. For example, a microphone 141 included on the mobile computing device 102 may receive verbal commands or voice data from a user. In some implementations, a voice module 143 may send the voice data to the network-connected display device 104 by way of the network 150. In some implementations, the voice module 143 may send the voice data to the network-connected display device 104 by way of a wireless communication link (e.g., wireless communication link 163*d*).

A user may speak into a voice input device providing a verbal description of media content they would like to view.

In addition, or in the alternative, the user may provide verbal commands describing how they would like to view and interact with the media content by speaking into the voice input devices.

The voice-based television assistant application 136 may receive the voice data from the voice input devices. The voice-based TV assistant application 136 may process the voice data or human speech to provide textual input as a sequence of words to the unified television application 130. In some implementations, the voice-based TV assistant application 136 may perform natural language processing to convert the human speech into the sequence of words. In some implementations, the voice-based TV assistant application 136 may be included in the remote control device 105. In some implementations, the voice-based TV assistant application 136 may be included in the voice module 143 on the mobile computing device 102. The sequence of words may be text representative of the verbal input received by the voice input device.

Figure 2:
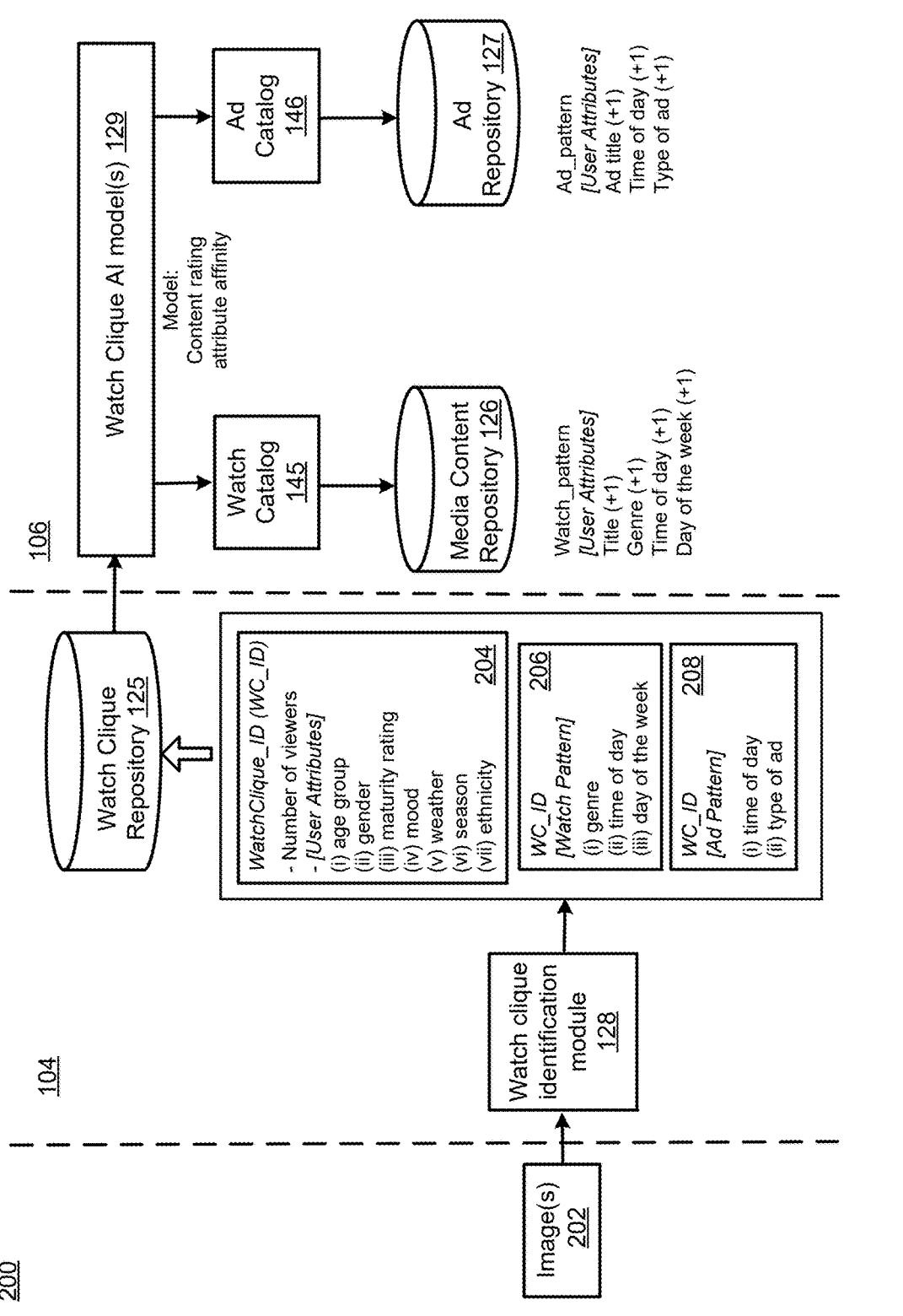
FIG. 2 is an illustration of an example flow diagram that shows the capture and use of one or more images of a viewing audience to create a watch clique for associating with the viewing audience according to implementations described throughout this disclosure.

FIG. 2 is an illustration of an example flow diagram 200 that shows the capture and use of one or more images of a viewing audience (e.g., the viewing audience 118*a*, the viewing audience 118*b*, the viewing audience 118*c*, the viewing audience 118*d*, or the viewing audience 118*e*) to create a watch clique for associating with the viewing audience. A TV application may use the information and data for the watch clique as a basis for providing media content recommendations and advertising content that may be considered relevant to the individuals in the watch clique. Referring to FIG. 1F, the watch clique identification module 128 running on the network-connected display device 104 may receive one or more images (e.g., image(s) 202) of the viewing audience (e.g., the viewing audience 118*a*, the viewing audience 118*b*, the viewing audience 118*c*, the viewing audience 118*d*, or the viewing audience 118*e*). In some implementations, the watch clique identification module 128 may receive the image(s) 202 from the integrated camera 121. In some implementations, the watch clique identification module 128 may receive the image(s) 202 from the room camera 123.

In some implementations, the user may take a picture or photograph of the viewing audience using a camera in the mobile computing device 102 (e.g., mobile camera 147). The mobile computing device 102 may interface with the network-connected display device 104 to send or provide one or more pictures or photographs of the viewing audience to the watch clique identification module 128 as image(s) 202. For example, referring to FIGS. 1A-C, the user 101 may sign into an account of the user 101 that is associated with the unified television application 130 on the network-connected display device 104. The user 101 may also sign into an account of the user 101 that is associated with the TV application 110 on the mobile computing device 102. The user 101 may interface with the TV application 110 on the mobile computing device 102 to facilitate the taking, providing, and/or sending of one or more pictures or images of a viewing audience (e.g., the viewing audience 118*a*, the viewing audience 118*b*, the viewing audience 118*c*) captured by the mobile camera 147 to the network-connected display device 104 for use by the watch clique identification module 128 when creating a watch clique for use by the unified television application 130.

The watch clique identification module 128 may associate a unique watch clique identifier (WatchClique_ID (WC_ID)) with a respective viewing audience 118*a-e* for a watch clique. The watch clique identification module 128 may associate user attributes 204 (WatchClique_ID (WC_ID)[User Attributes]) with a watch clique. The watch clique identification module 128 may include the number of viewers in the viewing audience for the watch clique with the user attributes 204. The watch clique identification module 128 may associate the viewers in the viewing audience for the watch clique with the watch clique. In some implementations, the watch clique identification module 128 may assign a viewer identifier (viewer ID) to each respective individual in a viewing audience. The viewer identifier may be based on one or more attributes associated with the viewer. The watch clique identification module 128 may identify and/or associate one or more attributes (user attributes) with the viewing audience of the watch clique. The viewer attributes may include, but are not limited to, age group, gender, maturity rating, mood, weather, season, and ethnicity.

In addition, or in the alternative, the watch clique identification module 128 may associate a watch pattern identifier 206 (WC_ID [Watch Pattern]) with the watch clique. The watch clique identification module 128 may identify and/or associate one or more attributes (watch pattern attributes) with the viewing audience of the watch clique. The watch pattern attributes may include, but are not limited to, genre, time of day, and day of the week.

In addition, or in the alternative, the watch clique identification module 128 may associate an advertisement pattern identifier 208 (WC_ID [Ad Pattern]) with the watch clique. The watch clique identification module 128 may identify and/or associate one or more attributes (advertisement pattern attributes) with the viewing audience of the watch clique. The advertisement pattern attributes may include, but are not limited to, time of day, and type of advertisement.

The watch clique identifier may be stored in a repository 125 along with the viewer identifiers for the individuals in the viewing audience of the watch clique, the user attributes for the watch clique, a watch pattern for the watch clique, and an ad pattern for the watch clique. In some implementations, an artificial intelligence (AI) module (e.g., the AI module 194) included on a server computer (e.g., server computer 106) communicatively coupled to a smart TV or network-connected display device (e.g., the network-connected display device 104) may interface with the repository 125. The information and data associated with each watch clique stored in the repository 125 may be provided to or accessed by the AI module 194 by way of the network 150. The AI module 194 may interface with the recommendation module 124, and the generative AI model(s) 164 to determine media content recommendations and/or advertisements for serving to the network-connected display device 104 that may be relevant and/or of interest to the individuals in a watch clique.

The watch clique AI model(s) 129 and the AI module 194 may interface with a watch catalog 145 and an advertisement (ad) catalog 146. For example, the watch catalog 145 may include a catalog or listing of media content items along with metadata associated with each media content item. The metadata may include information about the media content item such as title, genre, maturity rating, actors, likeability rating, runtime, etc. The AI module 194 interfacing with the watch clique AI model(s) 129 and using the metadata associated with each media content item may identify media content items included in a media content repository 126 for serving to a watch clique viewing the network-connected display device 104 (e.g., a viewing audience). The AI module 194 may identify the media content of potential interest to a watch clique based on the user attributes for the watch clique and the watch pattern for the watch clique.

For example, the ad catalog 146 may include a catalog or listing of advertisements for serving to users. For example, the ad catalog 146 may include a catalog or listing of advertisements along with metadata associated with each advertisement. The metadata may include information about the advertisement such as title, genre, product category, maturity level, runtime, etc. The AI module 194 interfacing with the watch clique AI model(s) 129 and using the metadata associated with each advertisement may identify advertisements included in an advertisement (ad) repository 127 for serving to a watch clique viewing the network-connected display device 104 (e.g., a viewing audience). The AI module 194 may identify advertisements of potential interest to a watch clique based on the user attributes for the watch clique and the advertisement pattern for the watch clique.

Referring to FIG. 1F, in some implementations the media content repository 126 may be hosted by one or more of the media content providers 160. In some implementations, the advertisement repository 127 may be hosted by a cloud server or advertisement provider server that may be communicatively coupled to the server computer 106 and the network-connected display device 104 by way of the network 150.

For example, referring to FIG. 1A, the viewing audience 118a may be associated with watch clique #1 (e.g., WC_ID 1). Watch clique #1 may watch family movies (e.g., movies rated for children and adults) every Friday night. Watch clique #1 may include viewers that are identified as children (e.g., individual 111c, individual 111d) and viewers that are identified as adults (e.g., user 101, individuals 111a-b, individual 111e). In another example, referring to FIG. 1B, the viewing audience 118b may be associated with watch clique #2 (e.g., WC_ID 2). Watch clique #2 may watch adult movies (e.g., movies rated for adults) every Saturday night after 8:00 pm. Watch clique #2 may include viewers that are all identified as adults (e.g., user 101, individual 111e, individuals 133a-b).

Referring to FIG. 1F, the unified television application 130 may initiate the taking of one or more pictures of a viewing audience for watch actions that occur at a regular frequency. For example, the room camera 123 and/or the integrated camera 121 may capture one or more images of a viewing audience after school hours on weekdays, on Friday nights, on Saturday mornings, on Saturday nights, etc. The unified television application 130 may determine the regular frequency for the capturing of the viewing audience during a watch action based on the history of the playing of media content on the network-connected display device 104 (e.g., a television (TV), a smart TV). For example, media content may be played on a TV after school hours on weekdays. In another example, media content may be played on a TV on Friday nights. In another example, media content may be played on a TV on Saturday mornings. In another example, media content may be played on a TV on Saturday evenings.

In addition, or in the alternative, the unified television application 130 may initiate the taking of one or more pictures of the viewing audience during a watch event to detect viewing audience drop off (e.g., a viewer falls asleep, a viewer is no longer watching the TV, etc.). In addition, or in the alternative, the unified television application 130 may initiate the taking of one or more pictures of the viewing audience during a watch event to capture image(s) of the viewing audience that may be used to identify attributes or traits of the viewers in the viewing audience while watching the media content playing during the watch event.

The server-side TV application 116 may facilitate the serving of media content from the media content providers 160 to the network-connected display device 104 for viewing by a viewing audience. In some implementations, the server-side TV application 116 may interface with the recommendation module 124 when serving the media content. The recommendation module 124 may impact the serving of the media content based on one or more of the creation and use of watch cliques, the advertisements determined to be relevant to the viewing audience (the watch clique), and the content providers or partners that provide the media content.

In addition, or in the alternative, the information and data associated with each watch clique stored in the repository 125 may be provided to or accessed by the AI module 194 by way of the network 150 for use in training and/or updating the watch clique AI model(s) 129.

For example, referring to FIGS. 1A-D, the creation and use of watch cliques may impact the For You tab (e.g., For You tab 115) of a user interface of a TV application as shown in the user interfaces 117a-e of the unified television application 130. The For You tab: Top Picks for You section of the user interface (e.g., Top picks for you row 119) may show top picks for the watch clique based on a watch pattern for the watch clique. In addition, or in the alternative, the user interface may include a what others are watching section (e.g., what others are watching row 131). The what others are watching row 131 may show media content recommendations that include media content items associated with similar watch patterns and/or user attributes as those for the watch clique.

In some implementations, advertisements (ads) may be targeted to a watch clique based on the advertisement (ad) patterns identified. For example, based on the relevance of the ad to the watch clique, a first watch clique may be served an ad about food while a second watch clique may be served an ad about cars. A server providing the advertisements to respective network-connected display devices (e.g., TVs) may target the relevant advertisement to each watch clique at the same time based on the watch pattern for each watch clique. For example, an advertisement may be served to the network-connected display device (e.g., the TV) by way of a featured carousel, ad-based video on demand (AVOD), live TV, and/or an instream banner.

For example, the content providers may provide media content recommendations based on the watch pattern of a watch clique. The TV application may provide the media content recommendations as television on demand (TVOD) row(s) in the user interface of the TV application. In addition, or in the alternative, a featured carousel may show new media content launches relevant to the watch pattern for the watch clique.

Figure 3:
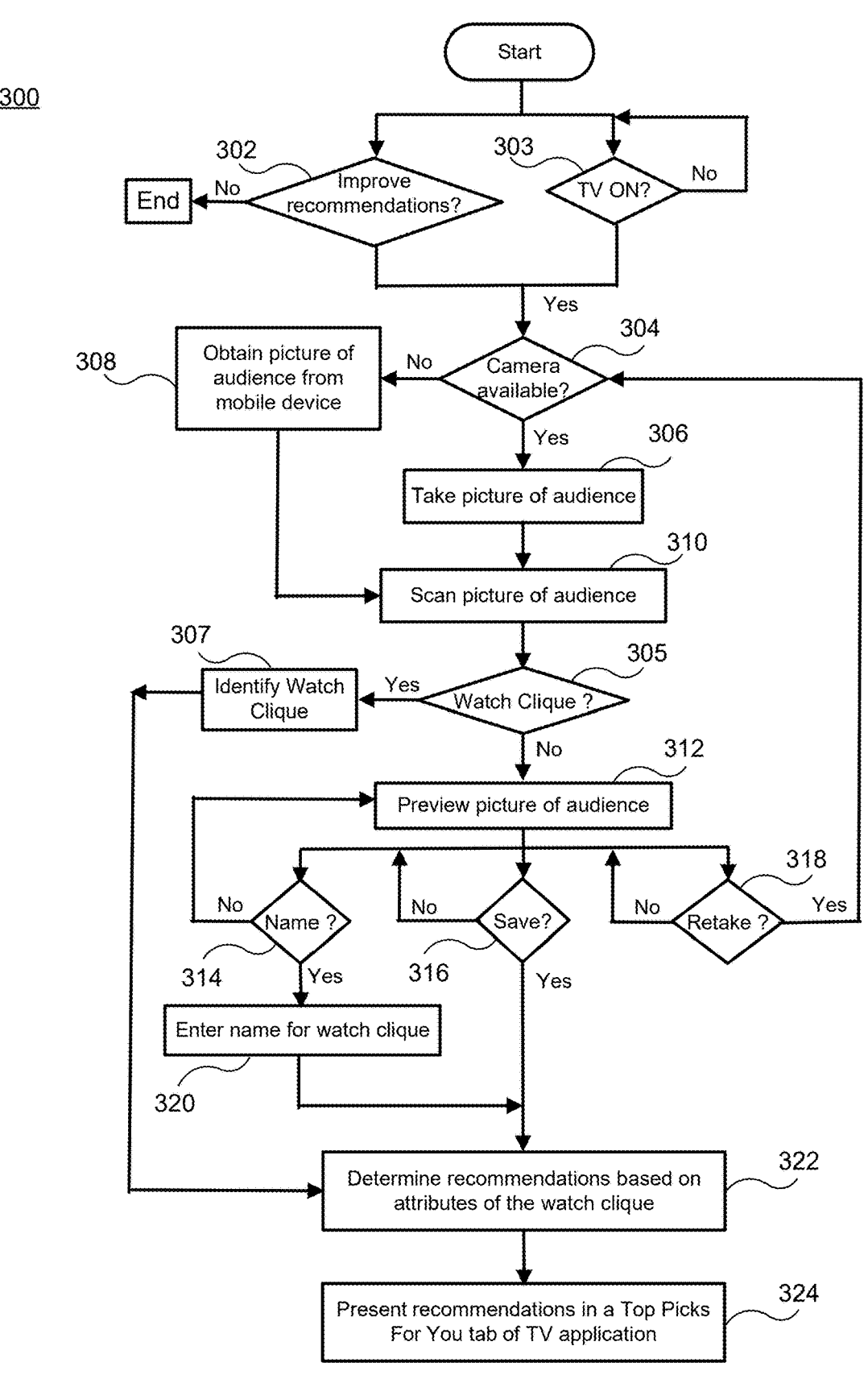
FIG. 3 is an illustration of an example flow diagram of a process for creating and using watch cliques for recommending media content and for serving relevant advertisements to a watch clique according to implementations described throughout this disclosure.

FIG. 3 is an illustration of an example flow diagram of a process 300 for creating and using watch cliques for recommending media content and for serving relevant advertisements to a watch clique. FIGS. 4A-F are illustrations of example user interfaces provided by a TV application for use in creating, managing, interacting with, and sharing information and data related to watch cliques. The process 300 will be described with reference to FIGS. 1A-E, and FIGS. 4A-F.

Figure 4A:
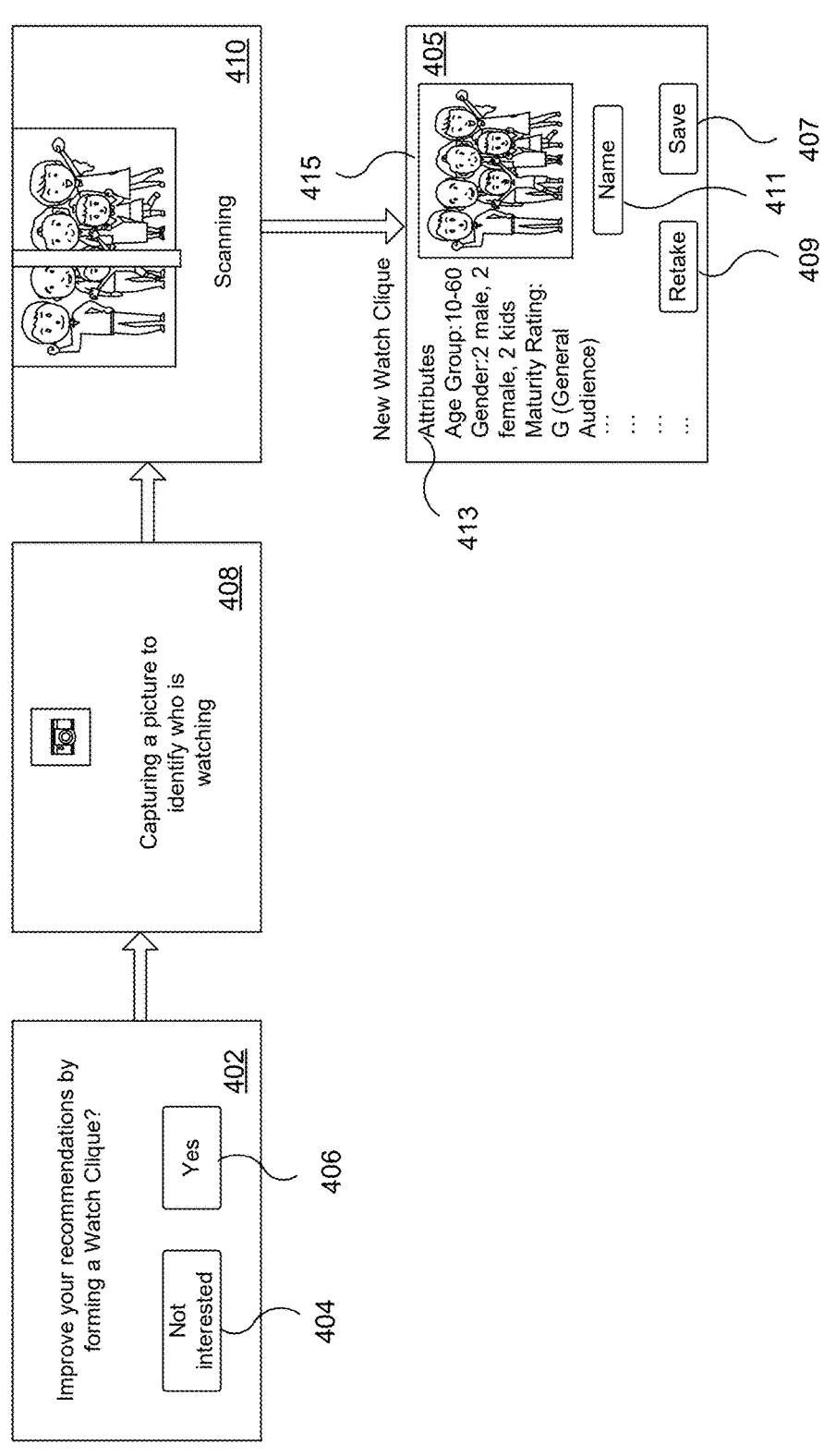
FIG. 4A is an illustration showing example user interfaces (UIs) for an example process for creating a watch clique from an image captured by a camera located in an area that includes a viewing audience and a network-connected display device presenting content for watching by the viewing audience according to implementations described throughout this disclosure.

FIG. 4A is an illustration showing example user interfaces (UIs) for an example process 400 for creating a watch clique from an image captured by a camera located in an area that includes a viewing audience and a network-connected display device presenting content for watching by the viewing audience. For example, a TV application (e.g., the unified television application 130) may present UI 402, UI 408, UI 403, and UI 405 as the UI 112 on the display 132 of the network-connected display device 104.

Figure 4B:
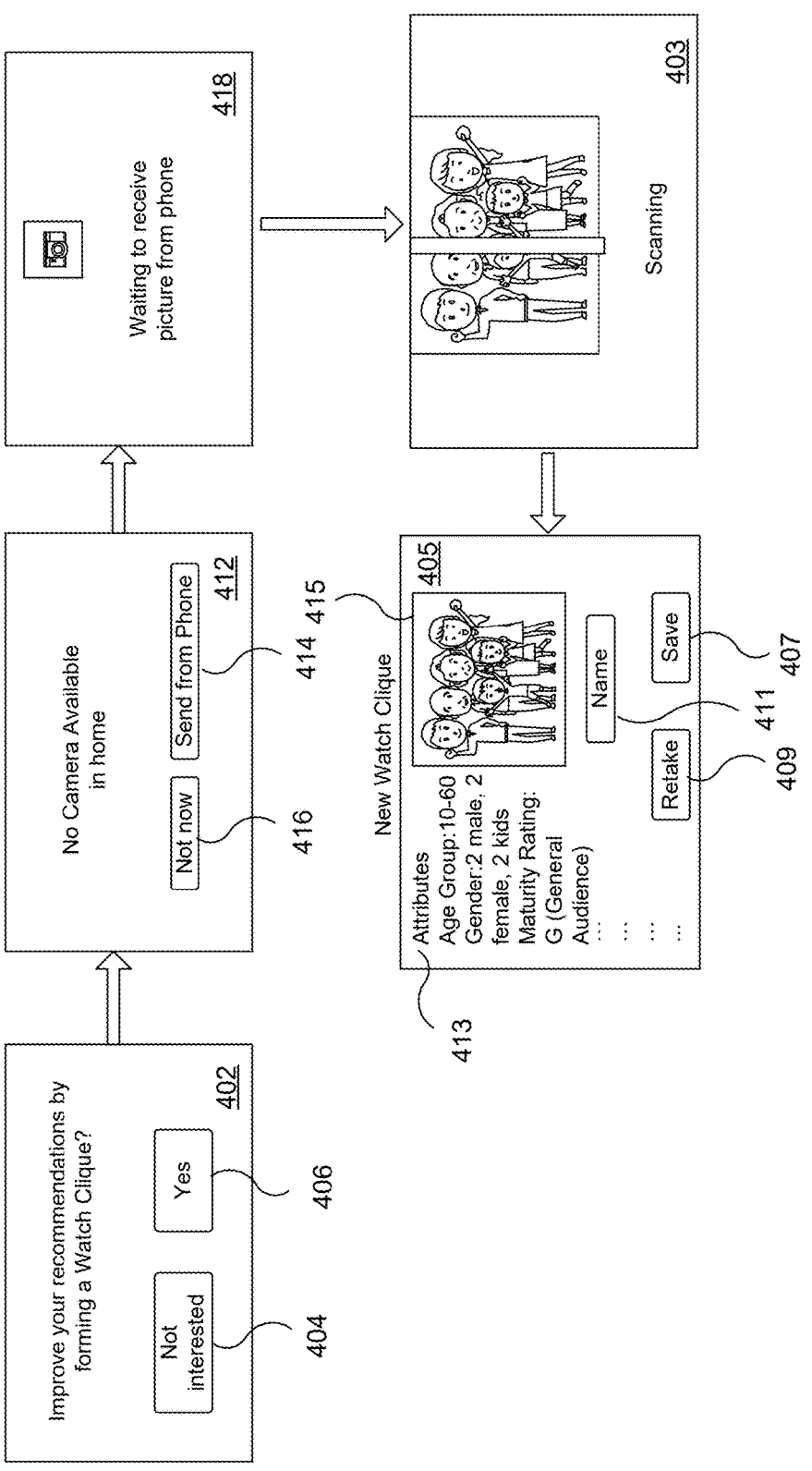
FIG. 4B is an illustration showing example user interfaces (UIs) for an example process for creating a watch clique from a picture of a viewing audience provided or sent to a network-connected display device presenting content for watching by the viewing audience according to implementations described throughout this disclosure.

The process 300 begins with a TV application (e.g., the unified television application 130) executing on a network-connected display device (e.g., the network-connected display device 104) presenting a user interface (e.g., user interface (UI) 402 in FIGS. 4A-B) that allows a user logged into an account associated with the TV application (e.g., the user 101) to select improving recommendations based on a watch clique (step 302). For example, referring to FIG. 4A, if the user selects not to improve recommendations (e.g., clicks on a not interested button 404), the process 300 ends. If the user does select to improve recommendations (e.g., clicks on a yes button 406), the process of creating a watch clique from image captures of a viewing audience to the scanning of the captured image(s) and the identifying of user attributes for the viewing audience is started.

FIG. 4B is an illustration showing example user interfaces (UIs) for an example process 410 for creating a watch clique from a picture of a viewing audience provided or sent to a network-connected display device presenting content for watching by the viewing audience. For example, a TV application (e.g., the unified television application 130) may present the UI 402, UI 412, UI 418, the UI 403, and the UI 405 as the UI 112 on the display 132 of the network-connected display device 104.

Referring to FIGS. 3, and 4A-B, the process 300 may determine if a camera is available for use by the network-connected display device (step 304). For example, the camera may be the integrated camera 121 and/or the room camera 123. If a camera is available for use by the network-connected display device, the TV application (e.g., unified television application 130) may initiate the capturing of least one image of a viewing audience of the network-connected display device (e.g., the network-connected display device 104) by the camera (e.g., integrated camera 121, room camera 123) (step 306). For example, referring to FIG. 4A, the unified television application 130 may present the UI 408. The unified television application 130 may trigger the taking of a picture of the viewing audience (e.g., viewing audience 118a, viewing audience 118b, viewing audience 118c, viewing audience 118d, or the viewing audience 118e) if the network-connected display device 104 by either the integrated camera 121 or the room camera 123.

In some implementations, the process 300 may include providing a camera preview of the images for capture in the UI 112 along with audio output on the network-connected display device (e.g., the network-connected display device 104). For example, the audio output may state "A group picture of everyone watching the TV is currently being captured for use in recommending appropriate content for viewing by everyone in the group." Next, a sidebar with audio content may indicate "capture complete."

If a camera is not available for use by the network-connected display device, the process 300 may continue by obtaining a picture of the viewing audience from a room camera or a mobile camera of the user (step 308). For example, referring to FIG. 4B, the TV application (e.g., unified television application 130) may present a user interface (e.g., UI 412) that may guide a user logged into an account associated with the TV application (e.g., the user 101) through a procedure for obtaining a picture of the viewing audience from a room camera (e.g., room camera 123) or a mobile camera (e.g., the mobile camera 147 of the mobile computing device 102) of the user (e.g., user 101).

For example, the user may take a picture of a viewing audience (e.g., the viewing audience 118a) with the camera 147 included on the mobile computing device 102. In another example, the user may take a picture of a viewing audience (e.g., the viewing audience 118a) with the room camera 123. The user may select an upload image button 414 to upload or send the picture to a network-connected display device (e.g., the network-connected display device 104) by way of a network (e.g., the network 150). In some implementations, the user may select a not now button 416. The selection of the not now button 416 may end the process 300.

For example, a user may provide a picture of the viewing audience to the TV application (e.g., unified television application 130) running on a network-connected display device (e.g., the network-connected display device 104). Referring to FIG. 1A, the user 101 may be hosting the individuals 111a-e. The user 101 may be logged into an account of the user 101 associated with the unified television application 130 running on the network-connected display device 104. For example, the unified television application 130 in the UI 112 may display a message "Improve your recommendations by giving us a picture of everyone watching the TV." The user 101 may take a photograph (picture) of the viewing audience with the mobile computing device 102 (e.g., a smartphone). The unified television application 130 may then provide subsequent user interfaces (e.g., the UI 412 and UI 418) to guide the user through providing the captured image to the network-connected display device 104 for use by the unified television application 130.

Once the network-connected display device has received the picture of the viewing audience, the process 300 continues by having the TV application scan the picture of the viewing audience (step 310). For example, referring to FIGS. 4A-B, the unified television application 130 may present the UI 403. Once the scan of the image is completed, the process 300 continues by determining if the individuals included in the picture of the viewing audience are a named and identified watch clique (step 305). If the individuals included in the picture of the viewing audience are already included in a named watch clique, the process 300 identifies the watch clique (step 307). Once the unified television application 130 identifies a watch clique, the unified television application 130 may present a UI 428. The UI 428 shows the name of the identified watch clique for the viewing audience and a picture of the viewing audience for the watch clique. The process 300 then continues to step 322.

If the individuals included in the picture of the viewing audience not part of a watch clique, the process 300 continues by providing a preview picture of the viewing audience along with a list of the identified user attributes of the individuals in the viewing audience in a user interface (step 312). For example, referring to FIGS. 4A-C, the unified television application 130 may present the UI 405. The UI 405 may include a name button 411, a save button 407, and a retake button 409. The UI 405 may include a preview picture of the viewing audience captured by the camera or uploaded to the network-connected display device 104 (e.g., preview image 415). The UI 405 may include a listing of identified user attributes for the individuals included in the viewing audience (e.g., attributes 413.)

For example, a user (e.g., user 101) may select or click on the name button 411 (step 314). In response, the unified television application 130 may present a user interface that allows the user 101 to enter a name for the viewing audience in the image 415 (step 320). In some implementations, the unified television application 130 may provide a name for the new watch clique. The user 101 may select or click on the save button 407 (step 316). In response, the unified television application 130 may save the information and data associated with the viewing audience in the image 415 (e.g., the attributes 413) as a watch clique for the user 101 with the name as provided by the user 101. For example, the view audience may the family of the user 101 and the user may name the watch clique "family." Referring to FIG. 1A, the viewing audience 118a may be captured in a picture and be presented as the preview image 415. The user 101 may create a watch clique for the viewing audience 118a and name it "family."

In some implementations, the user 101 may select or click on the retake button 409 (step 318). In these implementations, the process 300 will continue to step 304 to either retake the picture of the viewing audience (step 306) or to obtain another picture of the viewing audience from the mobile device 102 of the user 101 (step 308).

Figure 4C:
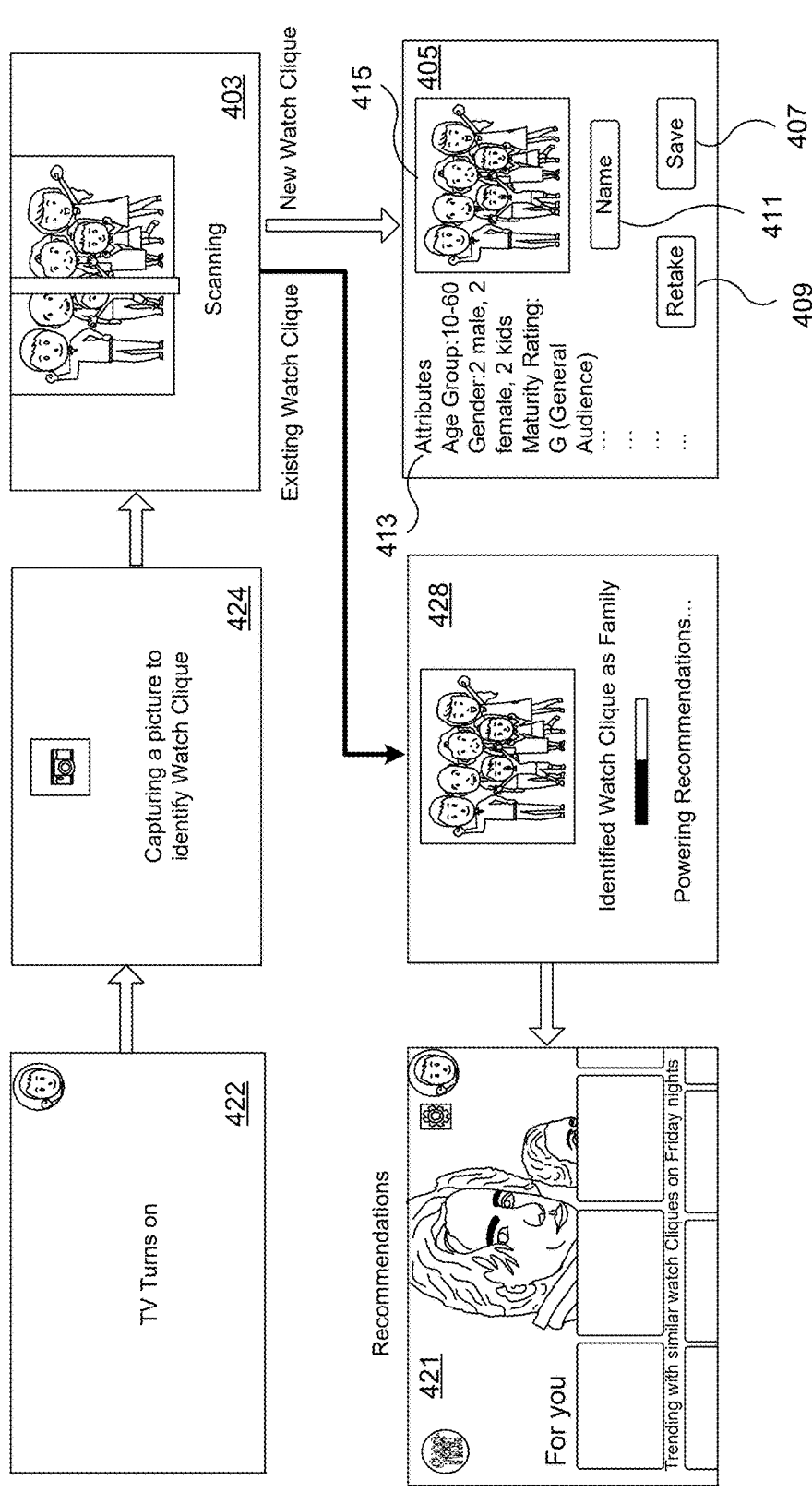
FIG. 4C is an illustration showing example user interfaces (UIs) for an example process for automatically creating a watch clique from a captured picture of a viewing audience that is triggered by a turning on of a network-connected display device according to implementations described throughout this disclosure.

Once the user either names the watch clique (step 320) or selects or clicks on the save button 407 (step 316), the unified television application 130 identifies a named watch clique for the individuals identified in the viewing audience captured in the picture. The process 300 then continues to step 322 where the process 300 determines media content recommendations based on the attributes of a watch clique. Referring to FIG. 4C, for example, the unified television application 130 may present a UI 421 that includes media content recommendations in a top picks for you tab of the unified television application 130 (step 324).

FIG. 4C is an illustration showing example user interfaces (UIs) for an example process 420 for automatically creating a watch clique from a captured picture of a viewing audience that is triggered by a turning on of a network-connected display device. For example, the user 101 may power on the network-connected display device 104 using the remote control device 105. The process 300 may detect the powering on of the network-connected display device 104 (step 303). In response, the network-connected display device 104 may display a UI 422. If a camera is available for use by the network-connected display device, the unified television application 130 may automatically initiate the capturing of at least one image of a viewing audience of the network-connected display device 104 by the camera (e.g., integrated camera 121, room camera 123) (step 306). The unified television application 130 may present a UI 424 indicating the capturing of a picture of the viewing audience. Once the picture is taken, the unified television application 130 may automatically present the UI 403 indicating the scanning of the picture (step 310). Once the scan of the image is completed, if it is determined that a watch clique for the individuals identified in the viewing audience captured in the picture does not exist (step 305), the process 300 continues by providing the UI 405 that includes a preview picture of the audience (step 312) along with the name button 411, the save button 407, and the retake button 409.

If it is determined that a watch clique for the individuals identified in the viewing audience captured in the picture does exist (step 305), the process 300 identifies the watch clique (step 307). Once the unified television application 130 identifies a watch clique, the unified television application 130 may present a UI 428. The UI 428 shows the name of the identified watch clique for the viewing audience and a picture of the viewing audience for the watch clique. The process 300 then continues to step 322.

At step 322, the process 300 determines media content recommendations based on the attributes of a watch clique. Referring to FIG. 4C, for example, the unified television application 130 may present a UI 421 that includes media content recommendations directed towards the currently selected watch clique (e.g., the family watch clique) in a top picks for you tab of the unified television application 130 (step 324).

After the creation of a watch clique, a user may view the identified attributes for the watch clique as shown in UI 405. In addition, or in the alternative, the user may name the watch clique by, for example, selecting or clicking on the name button 411. For example, a user may view and/or modify criteria associated with a watch clique such as attributes and a name from a watch clique settings user interface of a TV application that will be described in more detail, for example, as UI 444 in FIG. 4E.

The recommended media content for a watch clique may be presented in a user interface of a TV application (e.g., UI 421). The unified television application 130 may present the UI 421 when the user (e.g., user 101, the primary account user) is logged into the unified television application 130 on the network-connected display device 104. For example, the unified television application 130 may present the following in a user interface when the user 101 is logged into the unified television application 130 and accessing the network-connected display device 104 on a Friday night: "We noticed that you watch 'Comedy' with this watch clique on Friday nights. Here are some recommendations for watching tonight with the watch clique." In another example, the unified television application 130 may present the following in a user interface when the user 101 is logged into the unified television application 130 and accessing the network-connected display device 104: "Looks like your kids watch cartoons from 4:00 pm to 6:00 pm on weekdays. Would you like to automatically switch to the watch clique for your kids during this time?"

In some implementations, a user interface for a TV application (e.g., the unified television application 130) may include one or more of the following sections or rows when implementing the use of watch cliques: (i) a top picks for you section (e.g., the top picks for you row 119), (ii) a trending with similar watch cliques section (e.g., the what others are watching row 131), (iii) what people in the same age group are watching section, (iv) a recommended for guys night section, (v) a recommended for girls night section, or a (vi) a recommended for Christmas time section.

Figure 4D:
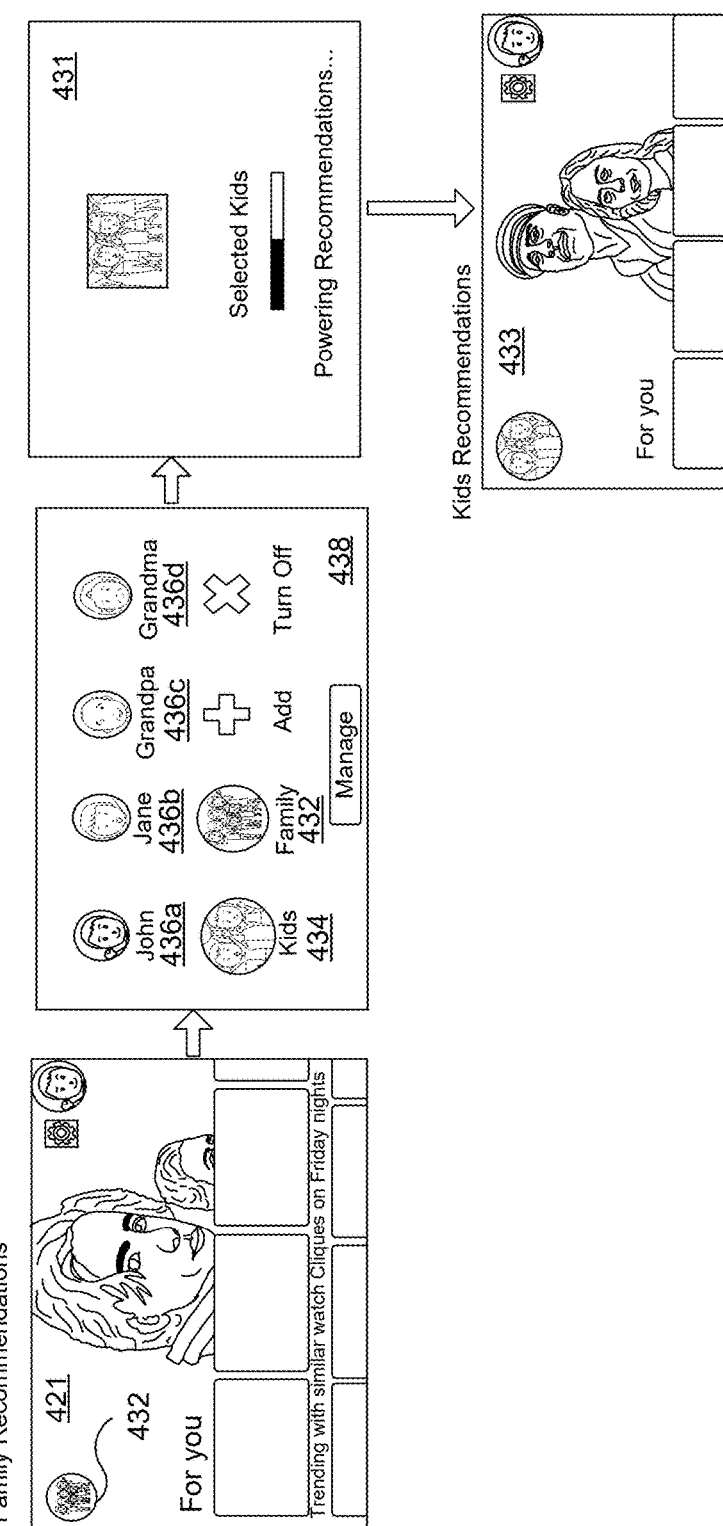
FIG. 4D is an illustration showing example user interfaces (UIs) for an example process for selecting an existing watch clique and receiving media content recommendations based on the attributes associated with the selected watch clique according to implementations described throughout this disclosure.

FIG. 4D is an illustration showing example user interfaces (UIs) for an example process 430 for selecting an existing watch clique and receiving media content recommendations based on the attributes associated with the selected watch clique. Referring to FIG. 4C, the unified television application 130 may present the UI 421 based on identifying a watch clique (e.g., the family watch clique). In some implementations, a user (e.g., the user 101) may want to select an alternative watch clique. For example, the user 101 may select or clique on a watch clique icon 432. The watch clique icon 432 may be an icon that represents the currently selected watch clique (e.g., the family watch clique). In response to the selection of the watch clique icon 432, the unified television application 130 may display UI 438. The UI 438 may include selectable icons that represent watch cliques (e.g., kids watch clique icon 434, family watch clique icon 432).

In addition, or in the alternative, the UI 438 may include individual icons 436a-d. The individual icons 436a-d may be icons that represent individuals that may be included in watch cliques along with the user 101. For example, referring to FIG. 1A, individual icon 436a may be an icon for the individual 111c (e.g., the son of the user 101). Individual icon 436b may be an icon for the individual 111d (e.g., the daughter of the user 101). Individual icon 436c may be an icon for the individual 111b (e.g., a grandfather). Individual icon 436d may be an icon for the individual 111a (e.g., a grandmother).

A user (e.g., the user 101) may select or click on the kids watch clique icon 434 in the UI 438. In response, the unified television application 130 may present a UI 431. The UI 431 may show an indication that the kids watch clique was selected by the user 101. The unified television application 130 may then present the UI 433. The UI 433 may include media content recommendations directed towards the currently selected watch clique (e.g., the kids watch clique) in a top picks for you tab of the unified television application 130.

Figure 4E:
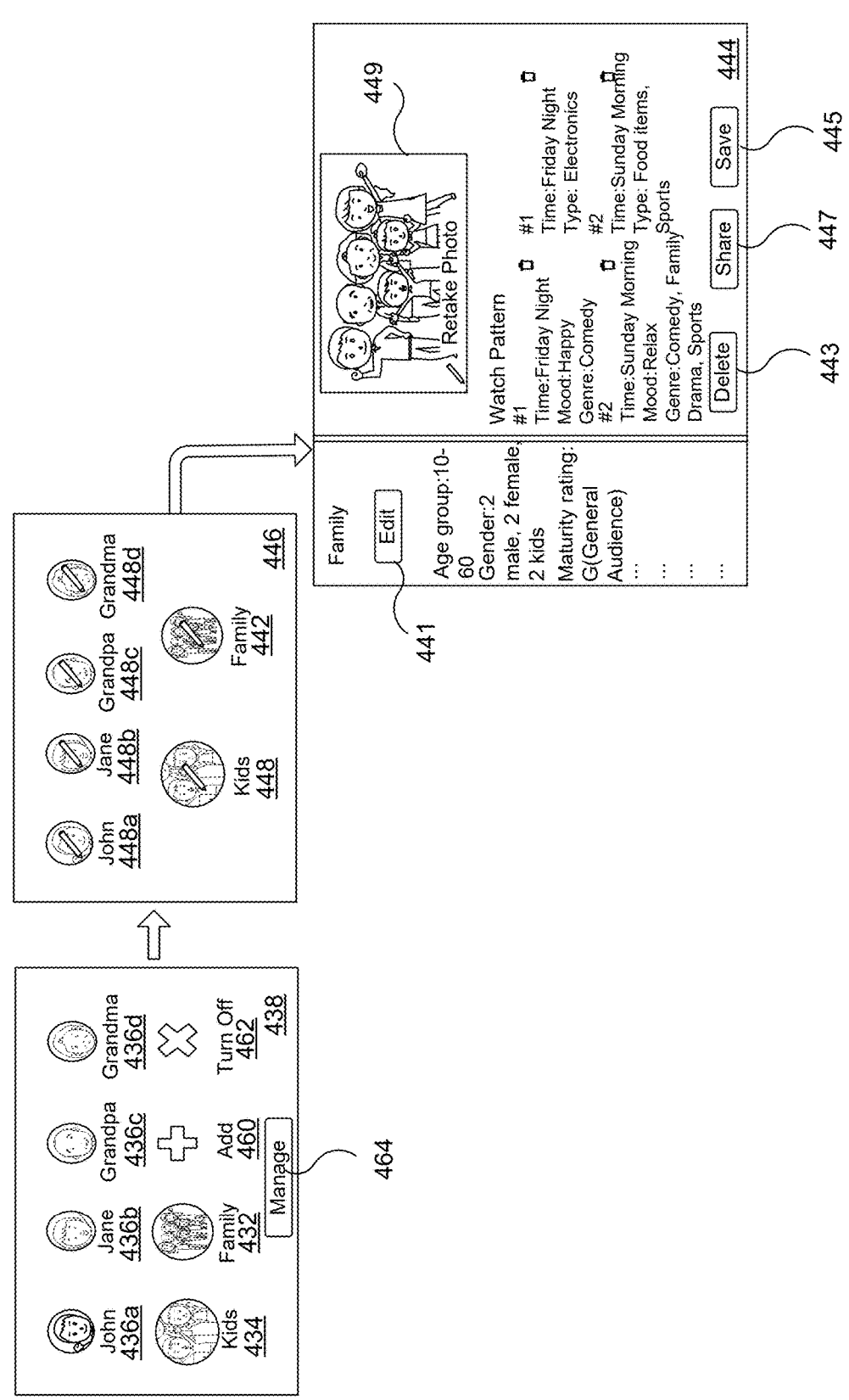
FIG. 4E is an illustration showing example user interfaces (UIs) for an example process for managing watch cliques according to implementations described throughout this disclosure.

FIG. 4E is an illustration showing example user interfaces (UIs) for an example process 440 for managing watch cliques. Referring to FIG. 4D, a TV application (e.g., the unified television application 130) may present the UI 421 based on identifying a watch clique (e.g., the family watch clique). In some implementations, a user (e.g., the user 101) may want to manage watch cliques. For example, the user 101 may select or clique on the watch clique icon 432. The watch clique icon 432 may be an icon that represents the currently selected watch clique (e.g., the family watch clique). In response to the selection of the watch clique icon 432, the unified television application 130 may display the UI 438.

The UI 438 may include selectable icons that represent watch cliques and/or individuals included in watch cliques of the user (e.g., the kids watch clique icon 434, the family watch clique icon 432). The user 101 may select or click on an add button 460. The selection of the add button 460 may allow the user 101 to manually add a watch clique. For example, the user 101 may create a new watch clique that may include individuals associated with the individual icons 436a-d. In addition, or in the alternative, the user 101 may add new individuals to a watch clique. The user 101 may select or click on the turn off icon 462. The selection of the turn off icon 462 may turn off or disable the use of watch cliques.

The user 101 may select or click on a manage button 464. In response, the unified television application 130 may present a UI 446. The UI 446 may present icons 448a-d that, if selected or clicked on by the user 101, allow the user 101 to manage (e.g., edit, save, share, and/or delete) the information and data associated with the individual associated with the icons 448a-d (e.g., individual 111c, individual 111d, individual 111b, and individual 11a, respectively). The UI 446 may present icon 448 and icon 442 that, if selected or clicked on by the user 101, allow the user 101 to manage (e.g., edit, save, share, and/or delete) the information and data associated with the watch clique associated with the icon 442 (e.g., the family watch clique) and the icon 448 (e.g., the kids watch clique).

Referring to FIG. 4E, the user 101 may select or click on the icon 442. In response, the unified television application 130 may present a UI 444. The user 101 may select or click on an edit button 441. The selection of the edit button 441 may allow the user to edit the information and data associated with the selected watch clique (e.g., the family watch clique) such as, for example, the attributes. The user 101 may select or click on a delete button 443 which may delete the selected watch clique. The user 101 may select or click on a save button 445. The selection of the save button 445 may allow the user to save any changes or edits made to the watch clique. The user 101 may select or click on a watch clique image 449. The selection of the watch clique image 449 may allow the user to retake the picture of the viewing audience for the watch clique.

Figure 4F:
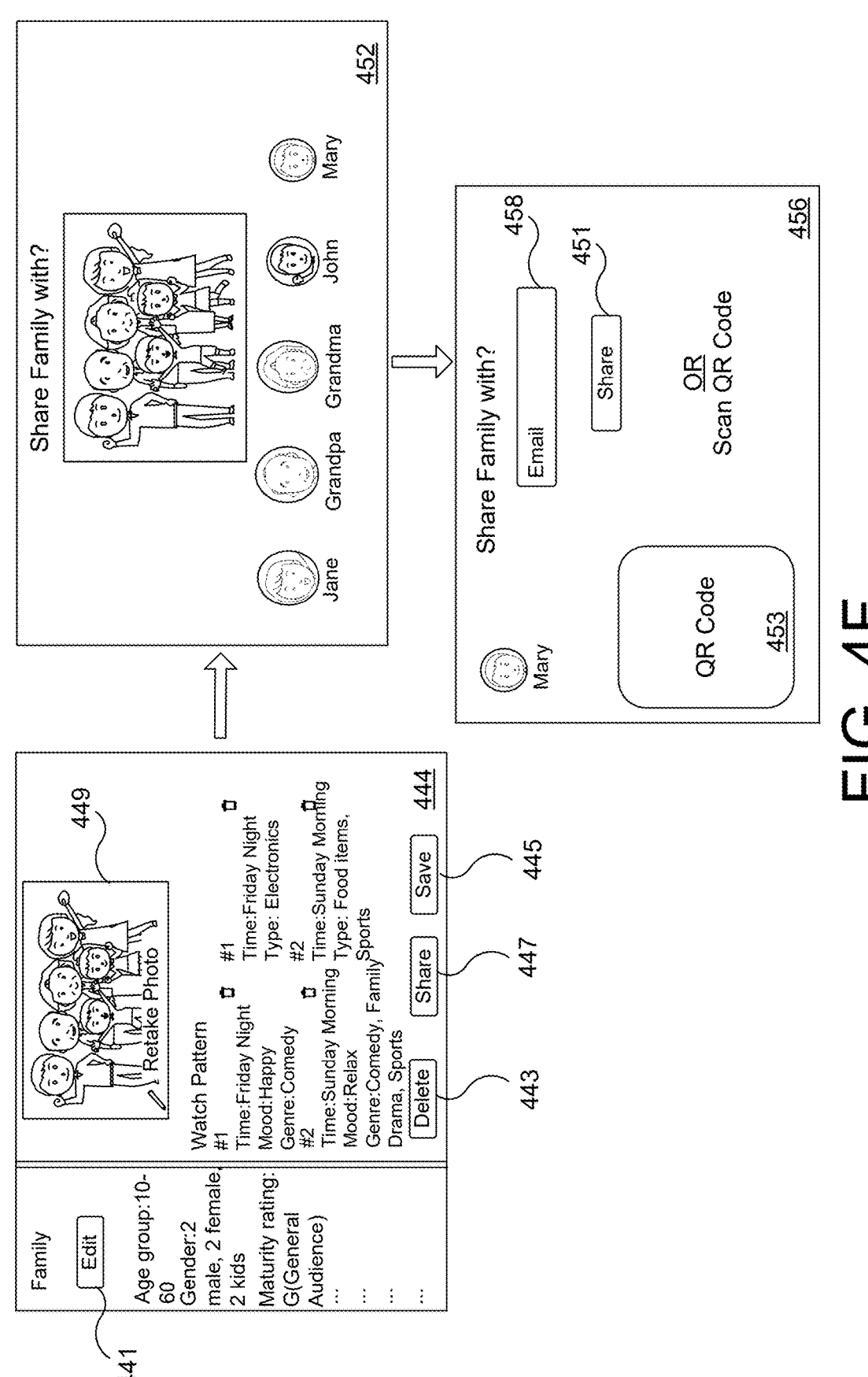
FIG. 4F is an illustration showing example user interfaces (UIs) for an example process for sharing a watch clique according to implementations described throughout this disclosure.

FIG. 4F is an illustration showing example user interfaces (UIs) for an example process 450 for sharing a watch clique. Referring to FIG. 4F, a user (e.g., the user 101) may select or click on a share button 447 included in the UI 444. In response, the unified television application 130 may present the UI 452. The UI 452 may include individual icons 454a-e. The individual icons 454a-e may be selectable icons that represent individuals that may be included in watch cliques along with the user 101. For example, referring to FIG. 1A, individual icon 454d may be a selectable icon for the individual 111c (e.g., the son of the user 101). Individual icon 454a may be a selectable icon for the individual 111d (e.g., the daughter of the user 101). Individual icon 454b may be a selectable icon for the individual 111b (e.g., a grandfather). Individual icon 454c may be a selectable icon for the individual 111a (e.g., a grandmother). Individual icon 454e may be a selectable icon for the individual 111e (e.g., the spouse of the user 101).

For example, the user 101 may choose to share the family watch clique with individual 111e. The user 101 may select or click on the individual icon 454e. In response, the unified television application 130 may present a UI 456. The UI 456 may allow the user 101 to enter information for sharing the watch clique, such as an email for the selected individual that may be entered into an email input box 458. The user 101 may select a share button 451 to initiate the sharing of the watch clique with the selected individual. In addition, or in the alternative, sharing the watch clique may include providing a quick response (QR) code 453 to the individual selected for sharing.

FIG. 5 illustrates a flowchart depicting example operations of creating a watch clique according to implementations described throughout this disclosure. Although the flowchart 500 of FIG. 5 illustrates the operations in sequential order, it will be appreciated that this is merely an example, and that additional or alternative operations may be included. Further, operations of FIG. 5 and related operations may be executed in a different order than that shown, or in a parallel or overlapping fashion. The operations may define a computer-implemented method. Although the flowchart 500 is described with reference to the system 100 of FIG. 1F, the flowchart 500 may be executed according to any of the figures discussed herein. In some examples, the operations of the flowchart 500 are executed by the network-connected display device 104.

Operation 510 includes receiving, by a computing device, an indication to obtain a picture of a viewing audience of the computing device.

Operation 520 includes receiving, by the computing device, the picture of the viewing audience that includes multiple individuals.

Operation 530 includes scanning the picture to identify attributes for the individuals included in the viewing audience.

Operation 540 includes creating a watch clique that includes the individuals.

Operation 550 includes associating the attributes with the watch clique.

Operation 560 includes determining media content recommendations for viewing by the viewing audience based on the attributes of the watch clique.

In some examples, the techniques described herein relate to a method including: receiving, by a computing device, an indication to obtain a picture of a viewing audience of the computing device; receiving, by the computing device, the picture of the viewing audience that includes individuals; scanning the picture to identify attributes of the individuals included in the viewing audience; creating a watch clique that includes the individuals; associating the attributes with the watch clique; and determining media content recommendations for viewing by the viewing audience based on the attributes of the watch clique.

In some examples, the techniques described herein relate to a method, further including: determining that the computing device is communicatively coupled to a camera; and triggering a taking of the picture of the viewing audience by the camera.

In some examples, the techniques described herein relate to a method, further including: determining that the computing device is not communicatively coupled to a camera; and facilitating the receiving of the picture of the viewing audience from a mobile computing device.

In some examples, the techniques described herein relate to a method, wherein powering the computing device on provides the indication to obtain the picture of the viewing audience of the computing device.

In some examples, the techniques described herein relate to a method, wherein creating the watch clique includes naming the watch clique.

In some examples, the techniques described herein relate to a method, wherein creating the watch clique includes initiating a retaking of the picture of the viewing audience.

In some examples, the techniques described herein relate to a method, wherein the indication to obtain the picture of the viewing audience of the computing device is received in a first user interface of a television application executing on the computing device; and wherein the method further includes presenting the media content recommendations in a second user interface of the television application.

In some examples, the techniques described herein relate to a method, wherein the computing device is a smart television.

In some examples, the techniques described herein relate to a non-transitory computer-readable medium storing executable instructions that when executed by at least one processor of a server computer cause the at least one processor to execute operations, the operations including: receiving an indication to obtain a picture of a viewing audience of a computing device; receiving the picture of the viewing audience that includes individuals; scanning the picture to identify attributes for the individuals included in the viewing audience; creating a watch clique that includes the individuals; associating the attributes with the watch clique; and determining media content recommendations for viewing by the viewing audience based on the attributes of the watch clique.

In some examples, the techniques described herein relate to a non-transitory computer-readable medium, wherein the operations further include: determining that the computing device is communicatively coupled to a camera; and triggering a taking of the picture of the viewing audience by the camera.

In some examples, the techniques described herein relate to a non-transitory computer-readable medium, wherein the operations further include: determining that the computing device is not communicatively coupled to a camera; and facilitating the receiving of the picture of the viewing audience from a mobile computing device.

In some examples, the techniques described herein relate to a non-transitory computer-readable medium, wherein powering the computing device on provides the indication to obtain the picture of the viewing audience of the computing device.

In some examples, the techniques described herein relate to a non-transitory computer-readable medium, wherein creating the watch clique includes naming the watch clique.

In some examples, the techniques described herein relate to a non-transitory computer-readable medium, wherein creating the watch clique includes initiating a retaking of the picture of the viewing audience.

In some examples, the techniques described herein relate to a non-transitory computer-readable medium, wherein the indication to obtain the picture of the viewing audience of the computing device is received in a first user interface of a television application executing on the computing device; and wherein the operations further include presenting the media content recommendations in a second user interface of the television application.

In some examples, the techniques described herein relate to a non-transitory computer-readable medium, wherein the computing device is a smart television.

In some examples, the techniques described herein relate to a system including: at least one processor; and a non-transitory computer-readable medium storing instructions that when executed by the at least one processor cause the system to: receive an indication to obtain a picture of a viewing audience of a computing device; receive the picture of the viewing audience that includes individuals; scan the picture to identify attributes for the individuals included in the viewing audience; create a watch clique that includes the individuals; associate the attributes with the watch clique; and determine media content recommendations for viewing by the viewing audience based on the attributes of the watch clique.

In some examples, the techniques described herein relate to a system, wherein the instructions that when executed by the at least one processor further cause the system to: determine that the computing device is communicatively coupled to a camera; and trigger a taking of the picture of the viewing audience by the camera.

In some examples, the techniques described herein relate to a system, wherein the instructions that when executed by the at least one processor further cause the system to: determine that the computing device is not communicatively coupled to a camera; and facilitate the receiving of the picture of the viewing audience from a mobile computing device.

In some examples, the techniques described herein relate to a system, wherein powering the computing device on provides the indication to obtain the picture of the viewing audience of the computing device.

Referring to FIGS. 1A-F, the mobile computing device 102 may be configured to execute the TV application 110. The mobile computing device 102 may include the mobile computing device display 108 configured to display the UI 114. A user may interact with the UI 114 to set up, control, and interact with the TV application 110. In some implementations, as described, the TV application 110 may display the virtual remote control 138 in the UI 114 allowing the user 101 to interact with and control the network-connected display device 104 and/or the media adapter 107.

The mobile computing device 102 may be any type of computing device that includes one or more processors (processor(s) 140), one or more memory devices (memory device(s) 142), and an operating system 144. The mobile computing device 102 may be a smartphone, a tablet, a wearable device, a laptop computer, or a desktop computer.

In some implementations, the operating system 144 may be system software that manages computer hardware, software resources, and provides common services for computing programs.

In some implementations, the mobile computing device 102 may be a tablet, a smartphone, or a wearable. In these implementations, the operating system 144 may be referred to as a mobile operating system. The mobile operating system may be configured to execute on devices that, in general, include display devices that may be smaller in size than, for example, a display device included in a laptop computer or a desktop computer. In some implementations, the mobile computing device 102 may be a laptop computer. In these implementations, the operating system may be referred to as a laptop or desktop operating system. In these implementations, the operating system 144 may be an operating system designed for a display that is larger in size than that included in a tablet, a smartphone, or a wearable.

In some implementations, the media adapter 107 (e.g., a casting device, a media streaming device, a media streaming player, a set-top box) may be interfaced with or connected to the network-connected display device 104. The media adapter 107 may interact with and communicate with the media content providers 160, the server computer 106, and the mobile computing device 102 when providing media content to the network-connected display device 104. In some implementations, the media adapter 107 may be embedded in and/or an integrated part of the network-connected display device 104.

The media content providers 160 may include a variety of streaming service and media content sources and service platforms. The media adapter 107 may facilitate providing (e.g., streaming) media content (e.g., streaming video such as movies, TV shows, etc.) from one or more streaming services included in the media content providers 160 to the network-connected display device 104. For example, the media adapter 107 may directly connect to a connector on the network-connected display device 104 by way of connection 165. The media adapter 107 may provide digital video and/or audio to the network-connected display device 104. For example, the media adapter 107 may connect to a high-definition multimedia interface (HDMI) connector included in the network-connected display device 104. Examples of the media adapter 107 may include, but are not limited to, a set-top box, a television box, and a streaming media adapter.

In some implementations, the mobile computing device 102 may connect to or interface with the media adapter 107 by way of a wireless communication link 163a. Wireless communication links 163a-f may be short-range wireless connections such as a Bluetooth connection. In some examples, wireless communication links 163a-f may be a Wi-Fi (e.g., direct Wi-Fi) connection.

The media adapter 107 may be any type of computing device that includes one or more processors (processor(s) 170), one or more memory devices (memory device(s) 172), and an operating system 174. In some implementations, the processor(s) 170 may include a system on a chip (SoC). The SoC may include a central processing unit (CPU), a graphic processing unit (GPU), one or more memory interfaces, and one or more input/output interfaces and devices. In some implementations, the operating system 174 may be system software that manages computer hardware, software resources, and provides common services for computing programs.

The network-connected display device 104 may include the unified television application 130. The unified television application 130 may keep a record of the interactions of the user with the media content received from the server computer 106. The network-connected display device 104 may send the record of the interactions to the server computer 106 for use in determining future media content recommendations for the user.

In some implementations, the network-connected display device 104 may be configured to execute the unified television application 130. For example, the network-connected display device 104 may be a smart television. For example, a smart television may be a network-connected television that may connect to media content providers (e.g., media content providers 160) by way of a network (e.g., the network 150). The media content providers may source media content to the smart television. In these implementations, a user may interact with the unified television application 130 to access media content from the media content providers 160. The unified television application 130 may interface with the server computer 106, and specifically with the server-side TV application 116. The unified television application 130 may provide similar functionality to the user as that provided by an application executing on the media adapter 107. For example, executing the unified television application 130 by the network-connected display device 104 allows the network-connected display device 104 to obtain a media content recommendation stream from the server computer 106.

The network-connected display device 104 may be configured to connect to the network 150. In some implementations, the network-connected display device 104 is a television (e.g., a smart television (TV)). The network-connected display device 104 may include one or more processors (processor(s) 156), one or more memory devices (memory device(s) 152), and an operating system (OS) 154. The operating system 154 may execute (or assist with executing) the unified television application 130.

In some implementations, the operating system 154 may be a browser application. A browser application is a web browser configured to access information on the Internet by way of a network (e.g., the network 150). A browser application may launch one or more browser tabs in the context of one or more browser windows in the browser application. In some implementations, the operating system 154 is a Linux-based operating system configured to execute (or assist with executing) the unified television application 130.

The system 100 may include one or more server computers (e.g., the server computer 106) configured to interface with the mobile computing device 102, the media adapter 107, the media content providers 160, and the network-connected display device 104 by way of the network 150. In some implementations, the network 150 may establish a wireless communication link between the network-connected display device 104, the mobile computing device 102, the media adapter 107, the media content providers 160, and the server computer 106.

The server computer 106 may include the unified media platform (UMP) 158. The UMP 158 may facilitate the providing of media content items to the network-connected display device 104 as described herein.

The server computer 106 may include the server-side TV application 116. The server-side TV application 116 may facilitate providing the media content items for playing on the network-connected display device 104.

The server computer 106 may include the recommendation module 124. The recommendation module 124 may interface with the knowledge module 166 and an artificial intelligence (AI) module 194 to determine recommended media content items for providing or sending to the network-connected display device 104 for use by the unified television application 130.

The server computer 106 may include the artificial intelligence (AI) module 194. The AI module 194 may receive information and data from the mobile computing device 102 and/or the network-connected display device 104 to build generative artificial intelligence (AI) model(s) 164 for use by the AI module 194.

The AI module 194 may receive updated media content recommendations from the knowledge module 166 along with updated information and data from the mobile computing device 102 and/or the network-connected display device 104 to retrain the generative AI model(s) 164. The AI module 194 may use the retrained generative AI model(s) 164 to update and/or finetune the recommendations for media content items to provide or send to the unified television application 130.

The mobile computing device 102 may include the mobile computing device display 108. In some implementations, the mobile computing device display 108 is a display device such as a liquid crystal display (LCD), a light-emitting diode (LED) display, an organic light-emitting diode (OLED) display, or an active-matrix organic light-emitting diode (AMOLED) display. The network-connected display device 104 may include the display 132. In some implementations, the display 132 is a display device such as a liquid crystal display (LCD), a light-emitting diode display (LED) display, a plasma display, a quantum dot light-emitting diode display (QLED) display, or an organic light-emitting diode (OLED) display.

The processor(s) 156, the processor(s) 140, the processor(s) 170, and the processor(s) 180 may be formed in a substrate configured to execute one or more machine executable instructions or pieces of software, firmware, or a combination thereof. The processor(s) 156, the processor(s) 140, the processor(s) 170, and the processor(s) 180 may be semiconductor-based. For example, the processor(s) 156, the processor(s) 140, the processor(s) 170, and the processor(s) 180 may include semiconductor material that can perform digital logic.

The memory device(s) 152, the memory device(s) 142, the memory device(s) 172, and the memory device(s) 182 may include main memory that stores information in a format that can be read and/or executed by the processor(s) 156, the processor(s) 140, the processor(s) 170, and the processor(s) 180 respectively. The memory device(s) 152, the memory device(s) 142, the memory device(s) 172, and the memory device(s) 182 may include one or more random-access memory (RAM) devices and/or one or more read-only memory (ROM) devices.

The memory device(s) 152, memory device(s) 142, the memory device(s) 172, and the memory device(s) 182 may store applications that, when executed by the processor(s) 156, the processor(s) 140, the processor(s) 170, and the processor(s) 180, respectively, perform operations. For example, the memory device(s) 142 may store the operating system 144 and the TV application 110 that, when executed by the processor(s) 140, may perform operations on the mobile computing device 102. For example, the memory device(s) 152 may store the operating system 154 and the unified television application 130 that, when executed by the processor(s) 156, may perform operations on the network-connected display device 104.

In some implementations, the memory device(s) 182 may represent any kind of (or multiple kinds of) memory (e.g., RAM, flash, cache, disk, tape, etc.). In some implementations, the memory device(s) 182 may include external storage, e.g., memory physically remote from but accessible by the server computer 106. The server computer 106 may include one or more modules, engines, or applications representing specially programmed software. In some implementations, the server computer 106 may include the operating system 184, the server-side TV application 116, the knowledge module 166, the AI module 194, the generative AI model(s) 164, the UMP 158, the recommendation module 124, processor(s) 180, and memory device(s) 182. For example, the memory device(s) 182 may store the operating system 184, the server-side TV application 116, the knowledge module 166, the AI module 194, the generative AI model(s) 164, the UMP 158, and the recommendation module 124 that, when executed by the processor(s) 180, may perform operations on server computer 106 to implement one or more of the methods and processes described herein.

The network 150 may include the Internet and/or other types of data networks, such as a local area network (LAN), a wide area network (WAN), a cellular network, satellite network, or other types of data networks. The network 150 may also include any number of computing devices (e.g., computer, servers, routers, network switches, etc.) that are configured to receive and/or transmit data within the network 150. The network 150 may further include any number of hardwired and/or wireless connections. The network 150 may be, for example, communications networks having one or more types of topologies, including but not limited to the Internet, intranets, local area networks (LANs), cellular networks, Ethernet, Storage Area Networks (SANs), telephone networks, and Bluetooth personal area networks (PAN). In some implementations, two or more devices in a sub-network may be coupled by way of a wired connection, while at least some of the devices in the same sub-network are coupled by way of a local radio communication network (e.g., ZigBee, Z-Wave, Insteon, Bluetooth, Wi-Fi and other radio communication networks).

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a non-transitory machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or non-transitory medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In this specification and the appended claims, the singular forms "a," "an" and "the" do not exclude the plural reference unless the context clearly dictates otherwise. Further, conjunctions such as "and," "or," and "and/or" are inclusive unless the context clearly dictates otherwise. For example, "A and/or B" includes A alone, B alone, and A with B. Further, connecting lines or connectors shown in the various figures presented are intended to represent example functional relationships and/or physical or logical couplings between the various elements. Many alternative or additional functional relationships, physical connections or logical connections may be present in a practical device. Moreover, no item or component is essential to the practice of the embodiments disclosed herein unless the element is specifically described as "essential" or "critical".

Terms such as, but not limited to, approximately, substantially, generally, etc. are used herein to indicate that a precise value or range thereof is not required and need not be specified. As used herein, the terms discussed above will have ready and instant meaning to one of ordinary skill in the art.

Moreover, use of terms such as up, down, top, bottom, side, end, front, back, etc. herein are used with reference to a currently considered or illustrated orientation. If they are considered with respect to another orientation, it should be understood that such terms must be correspondingly modified.

Further, in this specification and the appended claims, the singular forms "a," "an" and "the" do not exclude the plural reference unless the context clearly dictates otherwise. Moreover, conjunctions such as "and," "or," and "and/or" are inclusive unless the context clearly dictates otherwise. For example, "A and/or B" includes A alone, B alone, and A with B.

Although certain example methods, apparatuses and articles of manufacture have been described herein, the scope of coverage of this patent is not limited thereto. It is to be understood that terminology employed herein is for the purpose of describing particular aspects and is not intended to be limiting. On the contrary, this patent covers all methods, apparatus and articles of manufacture fairly falling within the scope of the claims of this patent.

Further to the descriptions above, a user may be provided with controls allowing the user to make an election as to both if and when systems, programs, or features described herein may enable collection of user information (e.g., a user's preferences, a user's current location, a user's credentials, etc.), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

What is claimed is:

1. A method comprising:

receiving, by an application executing on a computing device, a picture of a viewing audience of the computing device that includes individuals;

based on determining that the individuals in the picture are not included in a previously created watch clique, creating a new watch clique that includes the individuals, the creating comprising:

associating attributes of the individuals with the new watch clique; and naming the new watch clique;

determining media content recommendations for viewing by the viewing audience based on the attributes of the new watch clique;

displaying the media content recommendations and a first icon representative of the new watch clique in a first user interface of the application; and in response to receiving a selection of the first icon, enabling management of the new watch clique.

2. The method of claim 1, further comprising:

determining that the computing device is communicatively coupled to a camera; and triggering a taking of the picture of the viewing audience by the camera.

3. The method of claim 1, wherein the method further comprises, based on determining that the computing device is not interfaced to a camera, facilitating the receiving of the picture of the viewing audience from a mobile computing device that is interfaced to the computing device.

4. The method of claim 1, wherein powering the computing device on provides an indication to obtain the picture of the viewing audience of the computing device.

5. The method of claim 1, wherein the computing device is a smart television.

6. The method of claim 1, wherein the method further comprises, in response to receiving the selection of the first icon, displaying a second user interface of the application that includes a manage button; and wherein enabling management of the new watch clique is in response to receiving a selection of the manage button.

7. The method of claim 6, wherein the method further comprises:

receiving the selection of the manage button by a first individual included in the new watch clique; and wherein the management of the new watch clique includes sharing the new watch clique by the first individual with another individual included in the new watch clique.

8. The method of claim 1, further comprising:

based on determining that the individuals in the picture are included in the previously created watch clique, determining other media content recommendations for viewing by the viewing audience based on the attributes of the previously created watch clique;

displaying the other media content recommendations and a second icon representative of the previously created watch clique in a third user interface of the application; and in response to receiving a selection of the second icon, enabling management of the previously created watch clique.

9. A non-transitory computer-readable medium storing executable instructions that when executed by at least one processor of a computing device cause the at least one processor to execute operations, the operations comprising:

receiving, by an application executing on the computing device, a picture of a viewing audience of the computing device that includes individuals;

based on determining that the individuals in the picture are not included in a previously created watch clique, creating a new watch clique that includes the individuals, the creating comprising:

associating attributes of the individuals with the new watch clique; and naming the new watch clique;

determining media content recommendations for viewing by the viewing audience based on the attributes of the new watch clique;

displaying the media content recommendations and a first icon representative of the new watch clique in a first user interface of the application; and in response to receiving a selection of the first icon, enabling management of the new watch clique.

10. The non-transitory computer-readable medium of claim 9, wherein the operations further comprise:

determining that the computing device is communicatively coupled to a camera; and triggering a taking of the picture of the viewing audience by the camera.

11. The non-transitory computer-readable medium of claim 9, wherein the operations further comprise, based on determining that the computing device is not interfaced to a camera, facilitating the receiving of the picture of the viewing audience from a mobile computing device that is interfaced to the computing device.

12. The non-transitory computer-readable medium of claim 9, wherein powering the computing device on provides an indication to obtain the picture of the viewing audience of the computing device.

13. The non-transitory computer-readable medium of claim 9, wherein the computing device is a smart television.

14. The non-transitory computer-readable medium of claim 9, wherein the operations further comprise, in response to receiving the selection of the first icon, displaying a second user interface of the application that includes a manage button; and wherein enabling management of the new watch clique is in response to receiving a selection of the manage button.

15. The non-transitory computer-readable medium of claim 14, wherein the operations further comprise:

receiving the selection of the manage button by a first individual included in the new watch clique; and wherein the management of the new watch clique includes sharing the new watch clique by the first individual with another individual included in the new watch clique.

16. The non-transitory computer-readable of claim 9, wherein the operations further comprise:

based on determining that the individuals in the picture are included in the previously created watch clique, determining other media content recommendations for viewing by the viewing audience based on the attributes of the previously created watch clique;

displaying the other media content recommendations and a second icon representative of the previously created watch clique in a third user interface of the application; and in response to receiving a selection of the second icon, enabling management of the previously created watch clique.

17. A system comprising:

at least one processor; and a non-transitory computer-readable medium storing instructions that when executed by the at least one processor cause the system to:

receive, by an application executing on a computing device, a picture of a viewing audience of the computing device that includes individuals;

based on determining that the individuals in the picture are not included in a previously created watch clique, create a new watch clique that includes the individuals, the creating comprising:

associating attributes of the individuals with the new watch clique; and naming the new watch clique;

determine media content recommendations for viewing by the viewing audience based on the attributes of the new watch clique;

display the media content recommendations and a first icon representative of the new watch clique in a first user interface of the application; and in response to receiving a selection of the first icon, enable management of the new watch clique.

18. The system of claim 17, wherein the instructions that when executed by the at least one processor further cause the system to:

determine that the computing device is communicatively coupled to a camera; and trigger a taking of the picture of the viewing audience by the camera.

19. The system of claim 17, wherein the instructions that when executed by the at least one processor further cause the system to:

based on determining that the computing device is not interfaced to a camera, facilitate the receiving of the picture of the viewing audience from a mobile computing device that is interfaced to the computing device.

20. The system of claim 17, wherein powering the computing device on provides an indication to obtain the picture of the viewing audience of the computing device.

\* \* \* \* \*